United States Patent
Liu et al.

(10) Patent No.: US 12,518,168 B2
(45) Date of Patent: Jan. 6, 2026

(54) TRAINING AND APPLICATION METHOD APPARATUS SYSTEM AND STORAGE MEDIUM OF NEURAL NETWORK MODEL

(71) Applicant: CANON KABUSHIKI KAISHA, Tokyo (JP)

(72) Inventors: Junjie Liu, Beijing (CN); Tsewei Chen, Tokyo (JP); Dongchao Wen, Beijing (CN); Wei Tao, Beijing (CN); Deyu Wang, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 769 days.

(21) Appl. No.: 17/003,384

(22) Filed: Aug. 26, 2020

(65) Prior Publication Data

US 2021/0065011 A1    Mar. 4, 2021

(30) Foreign Application Priority Data

Aug. 29, 2019    (CN) .......................... 201910807591.6
Nov. 14, 2019    (CN) .......................... 201911115314.5

(51) Int. Cl.
*G06N 3/084*    (2023.01)
*G06N 3/045*    (2023.01)
*G06N 5/046*    (2023.01)

(52) U.S. Cl.
CPC ............. *G06N 3/084* (2013.01); *G06N 3/045* (2023.01); *G06N 5/046* (2013.01)

(58) Field of Classification Search
CPC ............................... G06N 3/084; G05N 3/045
See application file for complete search history.

(56) References Cited

U.S. PATENT DOCUMENTS

| | | | |
|---|---|---|---|
| 6,269,351 | B1 | 7/2001 | Black |
| 9,367,798 | B2 * | 6/2016 | Coenen .................... G06N 3/08 |
| 11,216,719 | B2 * | 1/2022 | Majumdar ............... G06N 3/04 |

(Continued)

FOREIGN PATENT DOCUMENTS

| | | |
|---|---|---|
| CN | 109740755 A | 5/2019 |
| CN | 109754063 A | 5/2019 |

(Continued)

OTHER PUBLICATIONS

Sambhav Jain, "Trained Uniform Quantization for Accurate and Efficient Neural Network Inference on Fixed-Point Hardware", 2019 (Year: 2019).*

(Continued)

*Primary Examiner* — Van C Mang
(74) *Attorney, Agent, or Firm* — Canon U.S.A., Inc., IP Division

(57) ABSTRACT

A training and application method, apparatus, system and storage medium of a neural network model is provided. The training method comprises: determining a constraint threshold range according to the number of training iterations and a calculation accuracy of the neural network model, and constraining a gradient of a weight to be within the constraint threshold range, so that when the gradient of a low-accuracy weight is distorted due to a quantization error, the distortion of the gradient is corrected by the constraint of the gradient, thereby making the trained network model achieve the expected performance.

17 Claims, 11 Drawing Sheets

(56) References Cited

U.S. PATENT DOCUMENTS

2014/0081895 A1  3/2014  Coenen
2019/0042945 A1  2/2019  Majumdar

FOREIGN PATENT DOCUMENTS

CN   110135573 A   8/2019
JP   2018067039 A  4/2018

OTHER PUBLICATIONS

Jungwook Choi, "PACT: Parameterized Clipping Activation for Quantized Neural Networks" (Year: 2018).*
Kingma, D. P., et al., "Adam: A Method for Stochastic Optimization" ICLR 2015, pp. 1-15.
Hinton, G., et al., "Neural Networks for Machine Learning", lecture 6a-6e.
Luo, L., et al., "Adaptive Gradient Methods with Dynamic Bound of Learning Rate", ICLR 2019, pp. 1-21.
Gradient Cropping in A-TensorFlow (Gradient Clipping).
Jain, S.R., et al., "Trained Uniform Quantization for Accurate and Efficient Neural Network Inference on Fixed-Point Hardware".

* cited by examiner

TRAINING AND APPLICATION METHOD APPARATUS SYSTEM AND STORAGE MEDIUM OF NEURAL NETWORK MODEL

The present disclosure claims priority to Chinese disclosure application Ser. No. 201911115314.5 filed on Nov. 14, 2019, and claims priority to Chinese disclosure application No. 201910807591.6 filed on Aug. 29, 2019, the entire contents of both are hereby incorporated by reference.

BACKGROUND

Field

The present disclosure relates to a modeling field of Deep Neural Networks (DNN), and in particular to a training method of neural network models suitable for different calculation accuracies.

Description of the Related Art

The deep neural network is a model with a complex network architecture. Common neural network models include a Convolutional Neural Network (CNN) model, a Recurrent Neural Network (RNN) model, a Graph Neural Network (GNN) model, and the like. FIG. 1 illustrates a simple neural network model architecture (a specific network architecture is not shown). After the data x (feature map) to be trained is input into a neural network model F, x is calculated layer by layer in the network model F from top to bottom, and finally an output result y that meets certain distribution requirements is output from the model F.

Taking the CNN model shown in FIG. 2 and FIG. 3 as an example, it is assumed that a convolution layer including three weights $w_1$, $w_2$, and $w_3$ exists in the model, and in the Forward Propagation process shown in FIG. 2, after a convolution operation is performed on an input feature map of the convolution layer and weights $w_1$, $w_2$, and $w_3$, respectively, an output feature map of the convolution layer is obtained and output to the next layer. Through layer-by-layer operations, the output result y of the network model is finally obtained. The output result y is compared with the output result y* expected by a user, and if the error between them does not exceed a predetermined threshold, it indicates that the performance of the current network model is better; otherwise, if the error between them exceeds the predetermined threshold, the error between the actual output result y and the expected output result y* is required to be used to update the weights $w_1$, $w_2$, and $w_3$ in the convolution layer in the Back Propagation process shown in FIG. 3, so as to optimize the performance of the network model. Here, the process of updating each weight in the network model is the training process of the network model.

In the process of updating each weight in the network model, according to the error evaluation function L(y, y*) (whose inputs are the actual output result y and the expected output result y* and which is a function for indicating the error between them), the partial derivative (gradient) g of each weight w is calculated layer by layer in the network model from bottom to top. It is assumed that the current network model to be trained has been trained t times (that is, the number of training iterations is t), there are several weights to be updated in the network model, and the weight currently being updated is $w_t$. First, the gradient $g_t$ of the weight $w_t$ is calculated according to the following formula (1); then, the weight $w_t$ is updated according to the following formula (2) to obtain the weight $w_{t+1}$ after the (t+1)-th (this) training.

$$g_t = \partial L(y,y^*)/\partial w_t \qquad \text{formula (1)}$$

$$w_{t+1} = w_t - \eta_t g_t \qquad \text{formula (2)}$$

Wherein $\eta_t$ is an update step scale (also known as a learning rate), which can be a constant or a variable and is used to scale the gradient $g_t$.

According to the above update process for the weight $w_t$, it is known that calculation of the gradient is an important step in the weight update process, but the above formula (2) only takes the relationship between the weight $w_t$ and the gradient into consideration, that is, only takes the gradient after the latest update into consideration, without taking into consideration of the effect of historical gradients (gradients in previous training iterations) on the gradients in this (current) training iteration, so that the direction inertia generated at the gradient position is small, which is adverse to the acceleration of neural network model training.

SUMMARY

According to an aspect of the present disclosure, there is provided a training method of a neural network model, comprising: determining gradients of weights in the neural network model during a back propagation; performing, for at least one of the determined gradients, the following processing: determining whether a gradient is within a constraint threshold range, and constraining a gradient that exceeds the constraint threshold range to be within the constraint threshold range, wherein the constraint threshold range is determined according to the number of training iterations and calculation accuracy of the neural network model; and updating weights using constrained gradients.

According to another aspect of the present disclosure, there is provided a training system of a neural network model, comprising: a server that stores at least one first network model, wherein the first network model provides information for synchronizing a second network model, and the server is used to determine gradients of weights in the first network model during a back propagation, and perform, for at least one of the determined gradients, the following processing: determining whether a gradient is within a constraint threshold range, and constraining a gradient that exceeds the constraint threshold range to be within the constraint threshold range, updating a weight using the constrained gradient, and outputting the updated weight, wherein the constraint threshold range is determined according to the number of training iterations and a calculation accuracy of the first network model; and a terminal that stores the second network model, wherein the terminal is used to synchronize the second network model using the weight output by the server.

According to another aspect of the present disclosure, there is provided a training apparatus of a neural network model, comprising: a gradient determination unit configured to determine gradients of weights in the neural network model during a back propagation; a gradient constraint unit configured to perform, for at least one of the gradients determined by the gradient determination unit, the following processing: determining whether a gradient is within a constraint threshold range, and constraining a gradient that exceeds the constraint threshold range to be within the constraint threshold range, wherein the constraint threshold range is determined according to the number of training iterations and a calculation accuracy of the neural network model; and an update unit configured to update weights using constrained gradients.

According to another aspect of the present disclosure, there is provided an application method of a neural network model, comprising: storing a neural network model trained based on the above training method; receiving a data set which is required to correspond to a task which can be executed by the stored neural network model; and performing operation on the data set in each layer in the stored neural network model from top to bottom, and outputting a result.

According to another aspect of the present disclosure, there is provided an application apparatus of a neural network model, comprising: a storage module configured to store a neural network model trained based on the above training method; a receiving module configured to receive a data set which is required to correspond to a task which can be executed by the stored neural network model; and a processing module configured to perform operation on the data set in each layer in the stored neural network model from top to bottom, and output a result.

According to another aspect of the present disclosure, there is provided a non-transitory computer-readable storage medium storing instructions, which, when executed by a computer, cause the computer to perform the training method based on the above neural network model.

Further features of the present disclosure will become apparent from the following description of exemplary embodiments with reference to the accompanying drawings.

BRIEF DESCRIPTION OF THE DRAWINGS

The accompanying drawings, which are incorporated in and constitute a part of the specification, illustrate exemplary embodiments of the present disclosure, and together with the description of the exemplary embodiments, serve to explain the principles of the present disclosure.

DESCRIPTION OF THE EMBODIMENTS

Figure 1:
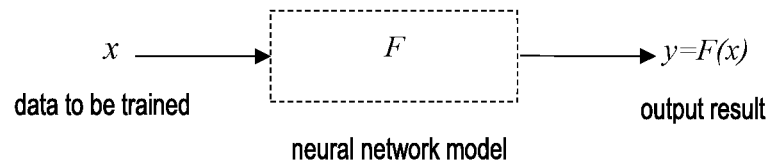
FIG. 1 illustrates a neural network model architecture.
Figure 2:
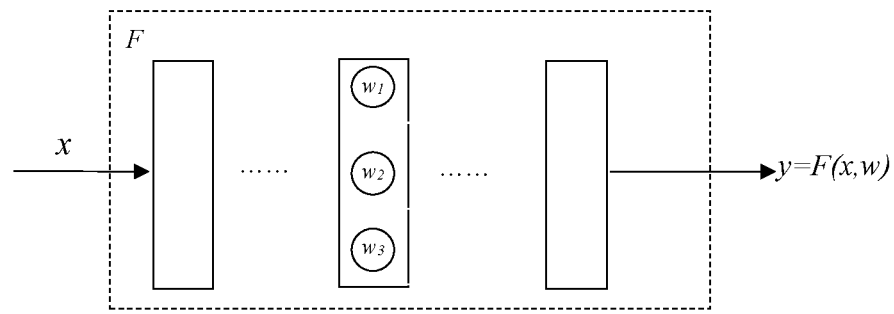
FIG. 2 illustrates a forward propagation process.
Figure 3:
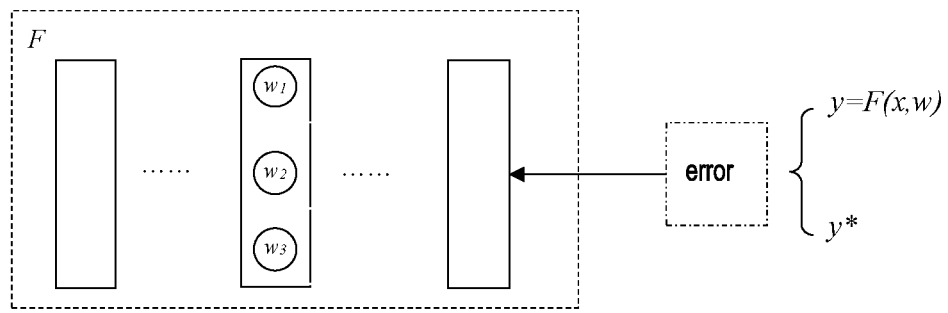
FIG. 3 illustrates a back propagation process.
Figure 4:
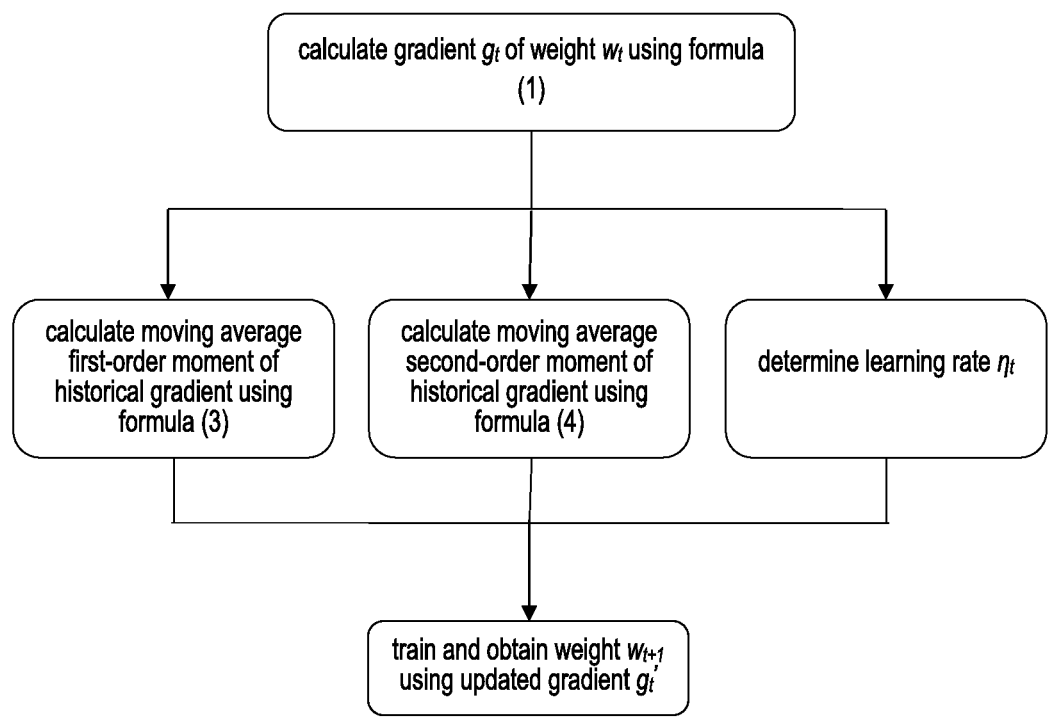
FIG. 4 illustrates a flowchart of the ADAM method.

In order to optimize the traditional weight update process, improve the convergence speed of the neural network model, and accelerate the training of the neural network model, an ADAM (Adaptive Moment Estimation) training method is proposed. When a certain weight is updated in the neural network model, historical gradients of the weights in previous updates (training) are used to update the gradient of the weight in this update (training), and thus a new gradient is used to update weights. FIG. 4 shows a flowchart of a method for updating weights based on the ADAM method. It is assumed that the neural network model to be trained has been trained t times (the number of training iterations is t), the weight $w_t$ in the neural network model is currently being updated, and the specific process includes:

First, the gradient $g_t$ of the weight $w_t$ is calculated using the aforementioned formula (1).

Then, the following derived formula (3) is used to calculate a moving average first-order moment of the historical gradients of the weight $w_t$, that is, weighted summation of the historical gradient first-order moments.

$$m_t = \beta_1 m_{t-1} + (1-\beta_1)g_t => (1-\beta_1)\Sigma_{i=1}^{t}\beta_1^{t-i}g_t \qquad \text{formula (3)}$$

Wherein $\beta_1 m_{t-1} + (1-\beta_1)g_t$ is a recursive formula, $m_{t-1}$ is calculated using $m_{t-2}$ and this formula, and so on, starting from $m_1$ of the first training, $m_2, m_3 \ldots m_{t-1}$ are calculated successively, so that a first-order weighted summation formula $(1-\beta_1)\Sigma_{i=1}^{t}\beta_1^{t-i}g_t$ is derived. The $\beta_1$ is a weighted value, represents a gradient attenuation rate and may be a constant, such as 0.9. $\beta_1^{t-i}$ in formula (3) represents the t−i power of $\beta_1$.

Next, the following derived formula (4) is used to calculate a moving average second-order moment of the historical gradients, that is, weighted summation of the historical gradient second-order moments.

$$V_t = \beta_2 V_{t-1} + (1-\beta_2)g_t^2 => (1-\beta_2)\text{diag}(\Sigma_{i=1}^{t}\beta_2^{t-i}g_t^2) \qquad \text{formula (4)}$$

Wherein $\beta_2 V_{t-1} + (1-\beta_2)g_t^2$ is a recursive formula similar to that in formula (3), starting from $V_1$ of the first training, $V_2, V_3 \ldots V_{t-1}$ are calculated successively, so that a second-order weighted summation formula $(1-\beta_2)\text{diag}(\Sigma_{i=1}^{t}\beta_2^{t-i}g_t^2)$ is derived. The $\beta_2$ is a weighted value, represents a gradient attenuation rate and may be a constant, such as 0.999. $\beta_2^{t-i}$ in formula (4) represents the t−i power of $\beta_2$.

Finally, according to the calculation results of formulas (3) and (4), the formula (5) is used to update the gradient $g_t$ to obtain the updated gradient $g_t'$; then the updated gradient $g_t'$ is further used to update the weight $w_t$ according to formula (6), so as to obtain the weight $w_{t+1}$ after this training.

$$g_t' = m_t/\sqrt{V_t} \qquad \text{formula (5)}$$

$$w_{t+1} = w_t - \eta_t g_t' = w_t - \eta_t m_t/\sqrt{V_t} \qquad \text{formula (6)}$$

In the ADAM-based weight update method, not only the gradient $g_t$ of the weight $w_t$ calculated in advance during this training is used, but also the historical gradients of the weight during the previous training are introduced by means of weighted summation to obtain the gradient $g_t'$ available in this training, so that a greater inertia can be adaptively generated at positions where the gradient is continuous in order to accelerate the training of the neural network model.

Figure 5A:
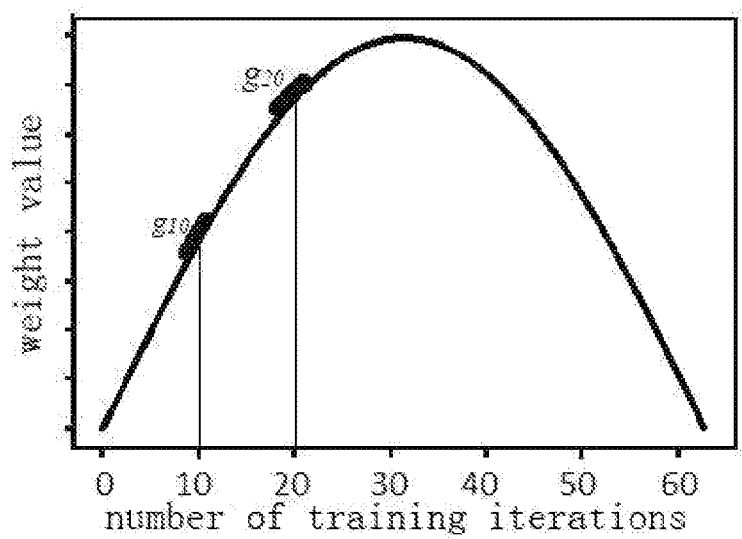
FIG. 5 (a) and FIG. 5 (b) illustrate weight values and gradient values in the case of high accuracy and low accuracy, respectively.
Figure 5B:
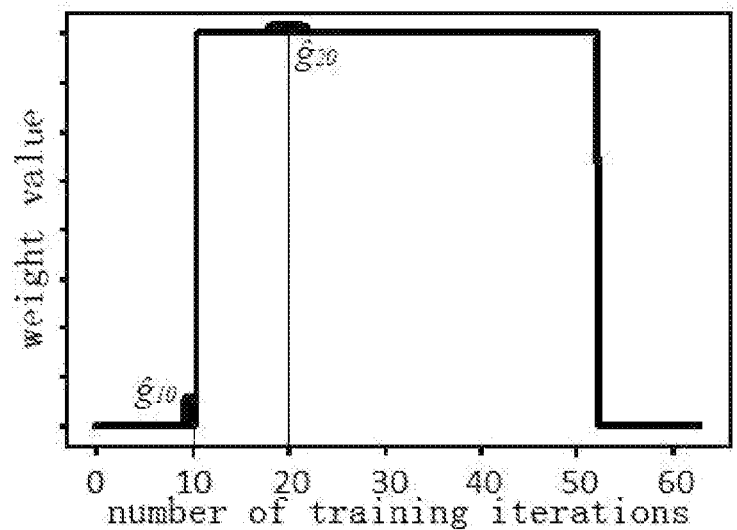
Figure 6A:
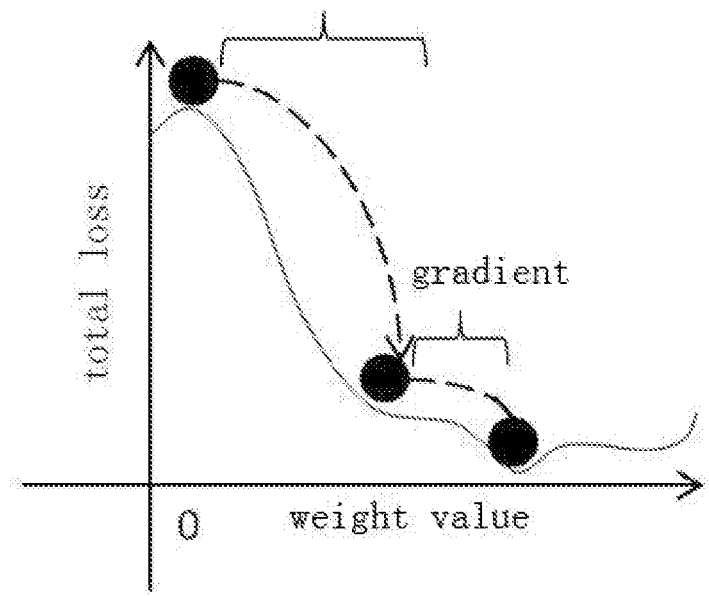
FIGS. 6 (a), 6 (b), and 6 (c) illustrate training results in the case of high accuracy, low accuracy, and the present disclosure, respectively.
Figure 6B:
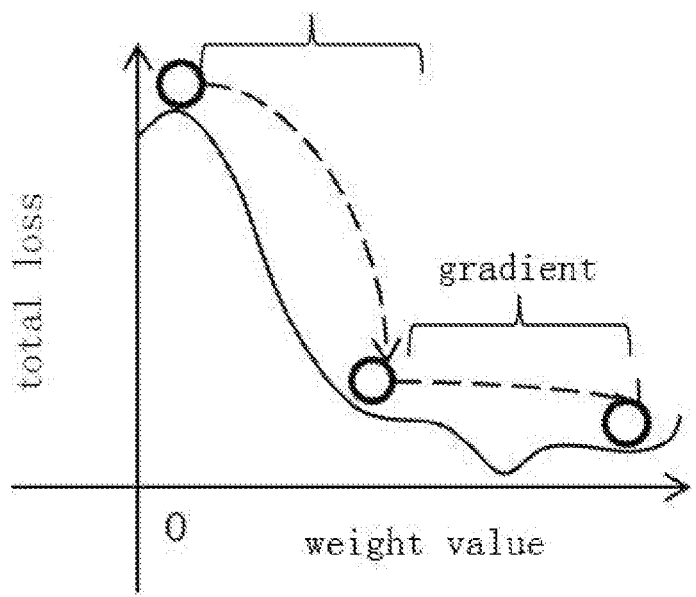
Figure 6C:
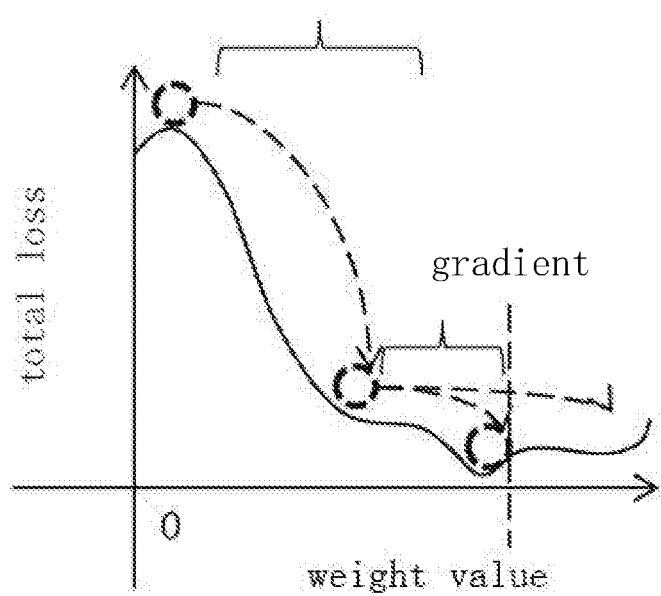

Although the ADAM method overcomes the problem that the training speed of traditional neural network models is slow, the premise of applying the ADAM method is that the trained neural network model is a high-accuracy model (weights and input x are high-accuracy), for example, the weight w in the model is a 32-bit floating-point type. As the number of training iterations increases, the weight w changes as shown in FIG. 5 (a), and its gradient is a tangent of the weight value. When the number of training iterations is 10, the gradient of the weight $w_{10}$ is $g_{10}$; when the number of training iterations is 20, the gradient of the weight $w_{20}$ is $g_{20}$. The gradient g here is the gradient after being updated according to the aforementioned ADAM method. As shown in FIG. 6 (a), when a high-accuracy neural network model is trained, as the number of training iterations increases, the gradient changes reasonably, and the difference value between the actual output result y and the expected output result y* of the network model gradually decreases (that is, the total loss gradually decreases), until it reaches the lowest point (the total loss does not exceed a predetermined threshold), so that the performance of the trained neural network meets the expectations.

When the high-accuracy neural network model is quantized to low accuracy, for example, a weight w of 32-bit floating-point type is quantized to a weight $w_b$ of Boolean type, and its value is only −1 or 1.

Wherein $w_b$=sign(w).

At this time, as the number of training iterations increases, the gradient change of the weight $w_b$ is shown in FIG. 5 (b). When the number of training iterations is 10, the gradient of the weight $w_{10b}$ is $\hat{g}_{10}$; when the number of training iterations is 20, the gradient of the weight $w_{20b}$ is $\hat{g}_{20}$.

Wherein the gradient of § can be obtained by deriving the following $\tilde{w}$:

$$\tilde{w}=\alpha\ \text{sign}(w)$$

Wherein α is a quantization scale factor.

Comparing FIG. 5 (a) with FIG. 5 (b), it can be known that $\hat{g}_{10}$ is theoretically infinite and $\hat{g}_{20}$ is theoretically zero. This is because there is a quantization error $\min_{\tilde{v}_t=F}\|\Upsilon_t - \tilde{\Upsilon}_t\|$ when the weight w of a high-accuracy floating-point type is quantized to $w_b$ of a low-accuracy fixed-point type (Wherein $$\Upsilon_{t+1} = \left(\frac{\sqrt{V_{t+1}}}{\eta_{t+1}}\ \frac{\sqrt{V_t}}{\eta_t}\right),$$

$\Upsilon$ is calculated in the same manner as $\tilde{\Upsilon}_{t+1}$, except that $\tilde{\Upsilon}_{t+1}$ is based on a fully refined network and $\Upsilon$ is based on a quantized network), which results in a difference between the gradient g of the weight w and the gradient ĝ of the weight $w_b$. When a low-accuracy network model is trained, if an inappropriate gradient ĝ is used continuously to update the weights, the accumulation of gradient differences may prevent the network model from achieving the expected performance. On the other hand, since the ADAM method requires weighted summation of historical gradients, passing quantization errors will be accumulated while weighted summing the historical gradients due to existence of quantization errors, which causes the direction inertia to shift and thus affects the training accuracy of the network model.

As shown in FIG. 6 (b), when the low-accuracy neural network model is trained, during the early stage of training, as the number of training iterations increases, the difference value between the actual output result y and the expected output result y* of the network model gradually decreases. However, as the number of training iterations increases, the gradient changes are unreasonable due to impropriety of the gradient ĝ. The difference value (that is, the total loss) between the actual output result y and the expected output result y* exceeds a predetermined threshold all the time, thereby causing that the performance of the trained neural network can't meet expectations.

In order to illustrate the deficiencies of the ADAM method in the present disclosure, the following three theorems are provided as supplementary explanations.

Theorem 1: Supposing that there is a quantization scale factor α and a binary quantization function sign(w). There is an online convex optimization problem. For the optimization of a quantitative neural network, any initial step scale η is given, and the ADAM cannot converge to the optimal solution. This is because it has a non-zero regret, that is, when T→∞, $R_T/T\to 0$.

Theorem 2: Supposing that there is a quantization scale factor α and a binary quantization function sign(w). Any $\beta_1$, $\beta_2$ is given, which belongs to [0, 1), and $\beta_1 < \sqrt{\beta_2}$. There is an online convex optimization problem. For the optimization of a quantitative neural network, any initial step scale η is given, and the ADAM cannot converge to the optimal solution. This is because it has a non-zero regret, that is, when T→∞, $R_T/T\to 0$. For any convex function $\{f_i\}_{i=1}^{\infty}$, the functional (F) has a constraint value $G_{\infty}$ with the constrained gradient.

Theorem 3: Supposing that there is a quantization scale factor α and a binary quantization function sign(w). Any $\beta_1$, $\beta_2$ is given, which belongs to [0, 1), and $\beta_1 </\sqrt{\beta_2}$. There is a random convex optimization problem. For the optimization of a quantitative neural network, any initial step scale η is given, the convergence speed C is based on the ADAM, and the ADAM is determined by $\beta_1$, $\beta_2$, α and $G_{\infty}$. For any convex function $[f_i]_{i=1}^{\infty}$, the functional (F) has a constraint value $G_{\infty}$ with the constrained gradient.

Wherein, as for the detailed description of the above Theorem 1, Theorem 2 and Theorem 3, please refer to the corresponding part of the <Theorems and inferences in the exemplary embodiments> in the specification.

Since the existing ADAM method has the above problems, the present disclosure proposes a training solution for a multilayer neural network model. Compared with the ADAM method, the solution in the present disclosure is not limited to being applied to a high-accuracy neural network model, and also has better performance in the training of low-accuracy neural network models.

As described above, when a low-accuracy network model is trained based on the ADAM method, compared with the training of a high-accuracy network model, there is a quantization error $\Upsilon$ for the quantization of weights, wherein w represents a high-accuracy weight and $w_b$ represents a low-accuracy weight after high-accuracy weights are quantized. Comparing FIG. 5 (a) with FIG. 5 (b), it can be seen that the gradient g of the weight w and the gradient ĝ of the weight we are significantly different. Therefore, weight update is performed by directly using the gradient ĝ, which will result in that the expected performance of the network model cannot be obtained. In view of this, the present disclosure provides an optimized method of training a neural network model, and in a case of fully taking into account the adverse effects of quantization errors on gradient operation of the low-accuracy weight, the constraint threshold range of the gradient is set based on the number of training iterations and the calculation accuracy of the neural network model, so that when the gradient of the low-accuracy weights is distorted due to quantization errors, the distorted gradient is constrained to be within the set constraint threshold range, the distortion of the gradient is corrected and thus the trained network model can achieve the expected performance. In the solution of the present disclosure, regardless of the calculation accuracy of the network model (for example, binary neural network models (BNNs)), as the number of training iterations increases, the gradient changes are made reasonable by constraining the gradient, so that the difference value (that is, the total loss) between the actual output result y and the expected output result y* of the network model can reach the lowest point (the error does not exceed the predetermined threshold), and thus the performance of the trained neural network meets the expectations, as shown in FIG. 6 (c).

Hereinafter, exemplary embodiments of the present disclosure will be described with reference to the accompanying drawings. For the purpose of clarity and conciseness, not all features of an embodiment are described in the specification. However, it should be understood that many implementation-specific settings must be made during the implementation of the embodiment in order to achieve the developer's specific goals, such as meeting those restrictions related to equipment and business, and these restrictions may change depending on the different implementations. In addition, it should also be understood that, although development work may be very complex and time-consuming, it is only a routine task for those skilled in the art having the benefit of the present disclosure.

It should also be noted here that in order to avoid obscuring the present disclosure due to unnecessary details, only the processing steps and/or system structures that are closely related to at least the solution according to the present disclosure are shown in the drawings, and other details not closely relevant to the present disclosure are omitted.

Next, various aspects of the present disclosure will be described.

First Exemplary Embodiment

Figure 7:
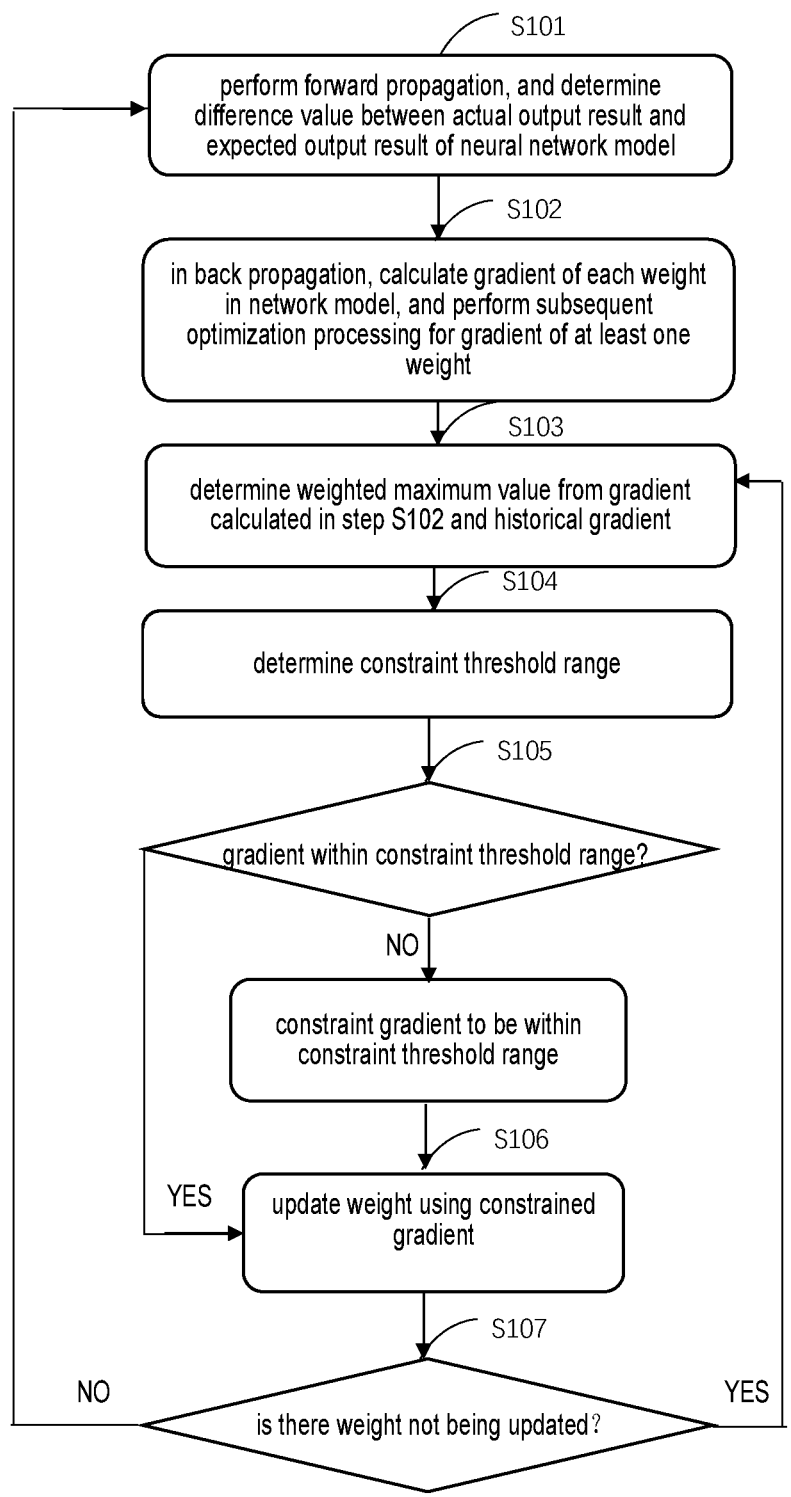
FIG. 7 is a flowchart of a training method of a neural network model according to a first exemplary embodiment of the present disclosure.

FIG. 7 illustrates a training method of a neural network model according to a first exemplary embodiment of the present disclosure, and specific description of the training method is as follows.

Step S101: The forward propagation of this training is performed, and the difference value between the actual output result and the expected output result of the neural network model is determined.

The training process of the neural network model is a cyclic and iterative process. Each training includes a forward propagation and a back propagation. Wherein the forward propagation is a process of layer-by-layer operation of the data x to be trained from top to bottom in the neural network model. The forward propagation process described in the present disclosure may be a known forward propagation process. The forward propagation process may include the quantization process of the weight of arbitrary bits and the feature map. The present disclosure is not limited to this. If the difference value between the actual output result and the expected output result of the neural network model does not exceed a predetermined threshold, it means that the weights in the neural network model are optimal solutions, the performance of the trained neural network model has reached the expected performance, and the training of the neural network model is finished. Conversely, if the difference value between the actual output result and the expected output result of the neural network model exceeds a predetermined threshold, the back propagation process needs to be continued, that is, based on the difference value between the actual output result and the expected output result, the operation is performed layer by layer in the neural network model from bottom to top, and the weights in the model are updated so that the performance of the network model with updated weights is closer to the expected performance.

The neural network model applicable to the present disclosure may be any known model, such as a convolutional neural network model, a recurrent neural network model, a graph neural network model, etc. The disclosure is not limited to the type of the network model.

The calculation accuracy of the neural network model applicable to the present disclosure can be arbitrary accuracy, for example, both high accuracy and low accuracy, and the terms "high accuracy" and "low accuracy" are relative to each other, and do not limit specific numerical values. For example, high accuracy can be a 32-bit floating-point type, and low accuracy can be a 1-bit fixed-point type. Of course, other accuracies such as 16-bit, 8-bit, 4-bit, and 2-bit are also included in the calculation accuracy range applicable to the solution of the present disclosure. The term "calculation accuracy" may refer to the accuracy of the weights in the neural network model, or the accuracy of the input x to be trained, which is not limited in the present disclosure. The neural network model described in the present disclosure may be binary neural network models (BNNs), and of course, it is not limited to neural network models with other calculation accuracy.

Step S102: In the back propagation, the gradient of each weight in the network model is calculated, and subsequent optimization processing for the gradient of at least one weight is executed.

In the back propagation, the layers involved in quantization in the forward propagation are processed using STE (gradient estimation) techniques.

It is assumed that, in this embodiment, subsequent optimization processing is performed for the gradient of the weight w.

Since the neural network model is a multi-layer structure, in the back propagation, the gradient value of the weight in each layer is calculated layer by layer from bottom to top using a chain method, according to the error evaluation function L(y, y*) (also known as the loss function). In this step S102, the method for calculating the gradient of the weight may be any known method, and the present disclosure is not limited to this.

Here, after a gradient of each one weight is calculated, subsequent optimization processing may be executed on the gradient. For example, when there are gradients of multiple weights that require subsequent optimization processing, the subsequent optimization processing is performed in series between the gradients of each weight; after the gradients of multiple weights belonging to the same layer are calculated, the subsequent optimization processing may be executed on the gradients of the weights in this layer, for example, the subsequent optimization processing may be executed in parallel on the gradients of the weights in the same layer, and may be performed in series on the gradients of the weights in different layers; after the gradients of all weights in the neural network model are calculated, the subsequent optimization processing may be executed on the gradients of a part or all of the weights, for example, the subsequent optimization processing is executed in series between the gradients of each weight, or in accordance with the order of layers from bottom to top in the neural network model, the subsequent optimization processing may be executed in parallel on the gradients of the weights in the same layer, and may be executed in series on the gradients of the weights in different layers. The present disclosure does not limit gradients of which weights to execute the subsequent optimization processing. For example, the subsequent optimization processing may be performed on gradient values of all weights, or the subsequent optimization processing may be performed only on gradients of weights such as in a convolution layer.

Step S103: The weighted maximum value is determined from the gradient of the weight w calculated in step S102 and the gradient of the weight w in the previous N trainings, wherein N is an integer greater than or equal to 1.

It is assumed that the network model to be trained has been trained t times (the number of training iterations is t), and in step S102, the gradient of the weight w is calculated as $g_t$. In this step S103, in consideration of the influence of the historical gradients on the gradient of this training, the gradients including the $g_t$ and gradients in the previous N trainings are weighted, and the maximum value is taken. The gradients in the previous N trainings may be a gradient updated using the method of the present disclosure, or may also be a gradient calculated by using formula (3), formula (4), and formula (5) with the ADAM method. The number N of historical gradients used here is not greater than t.

An optional algorithm for determining the weighted maximum value in step S103 is to calculate the weighted maximum value of the historical gradient second-order moment as shown in formula (7).

$$v_t = \beta_2 v_{t-1} + (1-\beta_2) g_t^2, \hat{v}_t = \max(\hat{v}_{t-1}, v_t) \quad \text{formula (7)}$$

Wherein, $\beta_2 v_{t-1} + (1-\beta_2) g_t^2$ is a recursive formula. The calculated $v_t$ and $\hat{v}_{t-1}$ are compared, and the larger value is used as the gradient after optimization processing is performed once in step S103. Since the weighted maximum value is determined in this step S103 during each training, a larger value is selected between $v_t$ calculated in the recursive formula in this training and the weighted maximum value $\hat{v}_{t-1}$ in the previous training, which can ensure that the weighted maximum value of the historical gradient second-order moment is determined in this step S103.

$\beta_2$ in formula (7) may be the same weighted value 0.999 as $\beta_2$ in formula (4), and may also be a weighted value determined according to the calculation accuracy of the neural network model. An optional algorithm for determining $\beta_2$ based on the calculation accuracy is shown in formula (8).

$$\beta_{2(t-1)} = 1 - \left(e^{-\beta_2(t)}\right)^{1-\frac{1}{\text{calculation accuracy}}} \quad \text{formula (8)}$$

Wherein, $\beta_{2(t)}$ represents $\beta_2$ during the t-th training, for example, 0.999; $\beta_{2(t-1)}$ represents $\beta_2$ during the (t−1)-th training, which is collectively determined by $\beta_{2(t)}$ and the calculation accuracy.

Figure 8:
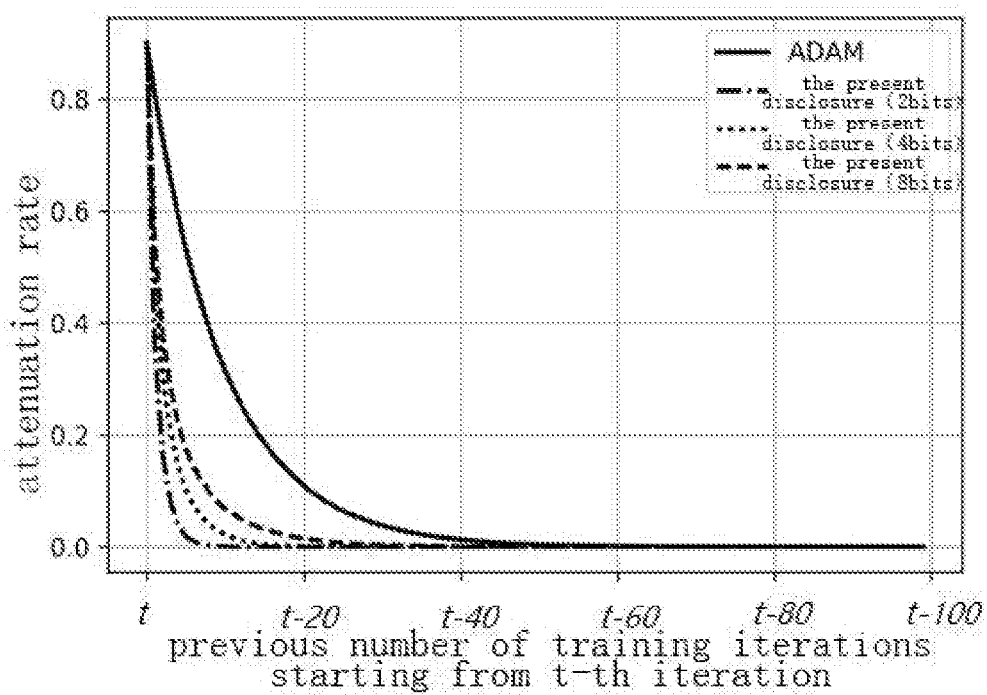
FIG. 8 illustrates changes in the attenuation rate under the ADAM method and the method of the present disclosure.

FIG. 8 illustrates changes in the attenuation rate based on the ADAM technology (the attenuation rate β ($\beta_1$ and $\beta_2$) is a fixed value) and in a case where the present disclosure calculates the attenuation rate β based on the calculation accuracy. It can be seen from FIG. 8 that in the ADAM technology, starting from the current t-th training, from about t−40 iterations, the previous attenuation rate approaches to zero; using the method of the present disclosure, starting from the current t-th training, and from about t−20 iterations, the previous attenuation rate approaches to zero. That is to say, in the ADAM technology, the gradient of the previous 40 iterations of the current iteration has a greater impact on the gradient of the t-th iteration, while in the technology of the present disclosure, the gradient of the previous 20 iterations of the current iteration has a greater impact on the gradient of the t-th iteration. Compared with the ADAM technology, in the technology of the present disclosure, the historical gradient is a smaller impact on the gradient in the current t-th training. That is, the lower the calculation accuracy of the neural network model is, the less the number of training required for the previous multiple trainings is, and the better the performance is.

Further, the weighted maximum value $v_t$ can be converted into the form of a diagonal matrix, referring to formula (9).

$$V_t = \text{Diag}(\hat{v}_t) \quad \text{formula (9)}$$

It should be noted that $V_t$ in formula (9) is a diagonal matrix of the weighted maximum value of the historical gradients, which is not equal to the diagonal matrix $V_t$ of the weighted summation of the historical gradients in formula (4).

Compared with the manner of weighted summing the historical gradient second-order moments in the ADAM method, taking the maximum value of weighting the historical gradient second-order moments in the first embodiment can better represent the direction inertia of the gradient of the current neural network model, and the manner of taking the weighted maximum value can make the performance of the network model similar to that of taking the weighted summation value. In the case of ensuring that the performance is not going worse, the weighted maximum value is used instead of the weighted summation value, which prevents the accumulation of quantization errors.

This step S103 is to optimize the gradient calculated in step S102 once. This is a preferred step in this embodiment, and this embodiment is not limited to the case of directly proceeding to step S104 from step S102.

Step S104: A constraint threshold range is determined.

In the training process of the neural network model, especially in the later stage of the training, in addition to using direction inertia to accelerate convergence, it is also necessary to set an appropriate gradient to converge at an appropriate step size. However, due to existence of the quantization error, especially in the case of low accuracy, the quantization error has a non-negligible impact on training, and the gradient that has been optimized once in step S103 needs to be constrained again. Therefore, how to determine the constraint threshold range appears particularly important.

From the above description, it can be known that, in a case where the accuracy is lower in the later stage of training, it is very necessary to constrain the gradient, that is, the number of training iterations and the calculation accuracy of the model have a large impact on the gradient, so the constraint threshold range can be determined by comprehensively considering both the number of training iterations and the calculation accuracy of the neural network model. Further, since the calculation accuracy of the neural network model directly determines the quantization error, determining the constraint threshold range based on both the number of training iterations and the calculation accuracy can also be regarded as determining the constraint threshold range based on the number of training iterations and the quantization error.

The quantization error used to determine the constraint threshold range can be a quantization error for the entire neural network model or a quantization error for each weight in the neural network model. According to the different meanings of the quantization error, the meaning of the determined constraint threshold range is also different. Specifically, on the one hand, if the quantization error used to determine the constrained threshold range is the quantization error for the entire neural network model (that is, quantization errors for all weights in the neural network model are calculated, and the maximum quantization error therein is used as the quantization error for the neural network model), the determined constraint threshold range is also for the entire neural network model. In this case, a gradient of any weight in the neural network model is constrained using the same constraint threshold range when performing optimization processing. On the other hand, if the quantization error used to determine the constraint threshold range is a quantization error for each weight, the constraint threshold range is determined for each weight, and the determined constraint threshold range constrains the gradient of the weight.

It is assumed that the upper limit value and the lower limit value of the constrained threshold range are two abstract limit functions, $c_u$ and $c_l$, respectively. An optional manner for calculating the upper limit value $c_u$ and the lower limit value $c_l$ is to use manners in the following formulas (10) and (11). In the algorithms shown in formulas (10) and (11), the abstract limit functions representing the upper limit value $c_u$ and lower limit value $c_l$ are monotonically decreasing and monotonically increasing, respectively.

$$c_u = 1 + \frac{1}{(1-\beta)t} \Upsilon_{t+1} \quad \text{formula (10)}$$

$$c_l = 1 - \frac{1}{(1-\beta)t+1} \Upsilon_{t+1} \quad \text{formula (11)}$$

Wherein t is the number of training iterations; $\Upsilon_{t+1}$ is the quantization error; $\beta$ is the weighted value, which can be $\beta_1$ in formula (3) with a value of 0.9, or can be calculated and determined according to the calculation accuracy of the neural network in the manner shown in formula (8); of course, $\beta$ can also be $\beta_2$ in formula (4) with a value of 0.999, or can be calculated and determined according to the calculation accuracy of the neural network in the manner shown in formula (8). Here, $\beta$ is a weighted value indicating the gradient attenuation rate. In addition to selection $\beta_1$ or $\beta_2$ as $\beta$ mentioned above, this embodiment is not limited to setting $\beta$ by other manners.

It can be seen from formulas (10) and (11) that the upper limit value and the lower limit value of the constraint threshold range are determined by the quantization error l(w, $w_b$) of the neural network model and the number of training iterations t. Since the value of $\beta$ is always less than 1 and l(w, $w_b$) is always greater than 0, when the number of training iterations t is large (close to infinity), the two abstract boundary functions $c_u$ and $c_l$ are approaching to each other.

In an optional manner, no matter whether the neural network model starts training for the first time or restarts training after the training is interrupted, t starts from 0; in another optional manner, when the neural network model starts training for the first time, t starts from 0, and when the neural network model restarts training after the training is interrupted, t starts from where the training is interrupted.

The above formula (10) and formula (11) are an optional manner to implement this step, and the present disclosure is not limited to reasonable modifications of formula (10) and formula (11), or other manners for determining the constraint threshold range based on the number of training iterations and quantization errors of the neural network model.

Step S105: It is judged whether the gradient is within the constraint threshold range, if yes, proceeding to step S106; if not, constraining the gradient to a value within the constraint threshold range.

The gradient value which has been optimized once in step S103 is to be optimized (constrained) twice in this step S105. An optional constraint manner is the manner shown in formula (12).

$$\tilde{V}_t = \Pi_F(\hat{V}_t) \quad (12)$$

Wherein F is the constraint mapping value domain [μ, t]; $V_t$ is the diagonal matrix of the weighted maximum value of the historical gradient second-order moment in formula (9); $\Pi_F(\ )$ is the constraint mapping operation, which means that $V_t$ is mapped into $[c_l, c_u]$; $\tilde{V}_t$ represents the gradient after constraint. When $V_t$ is greater than t, $V_t$ is constrained to $[c_l, c_u]$, for example, $V_t$ is constrained as the upper limit value t; when $V_t$ is less than μ, $V_t$ is constrained to $[c_l, c_u]$, for example, $V_t$ is constrained as the lower limit value μ. The present disclosure is also not limited to constraining $V_t$ as other values within $[c_l, c_u]$, for example, when $V_t$ is not in $[c_l, c_u]$, $V_t$ is constrained as an average value of the upper limit value and lower limit value.

Figure 9A:
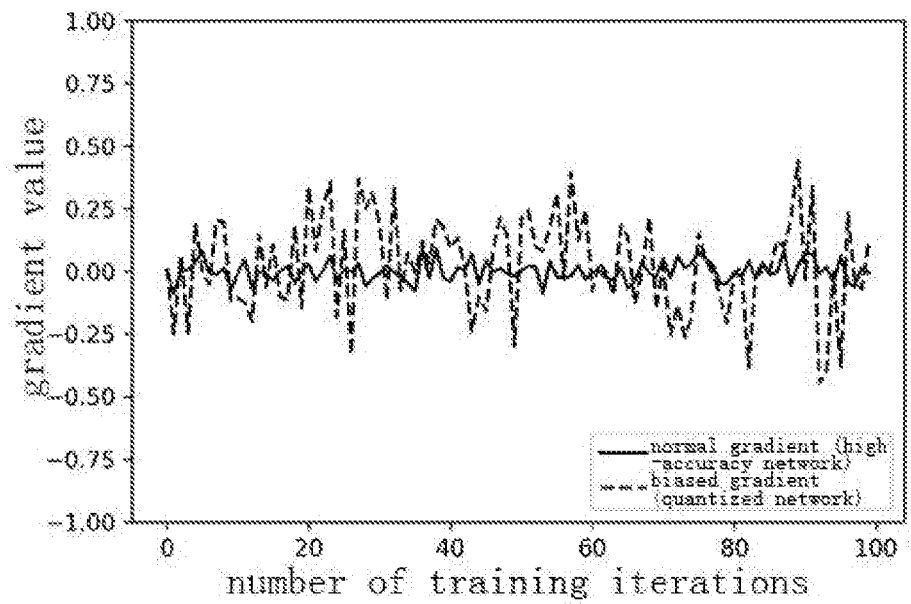
FIGS. 9 (a) and 9 (b) illustrate gradient changes under high accuracy, low accuracy (not using the technology of the present disclosure), and low accuracy (using the technology of the present disclosure).
Figure 9B:
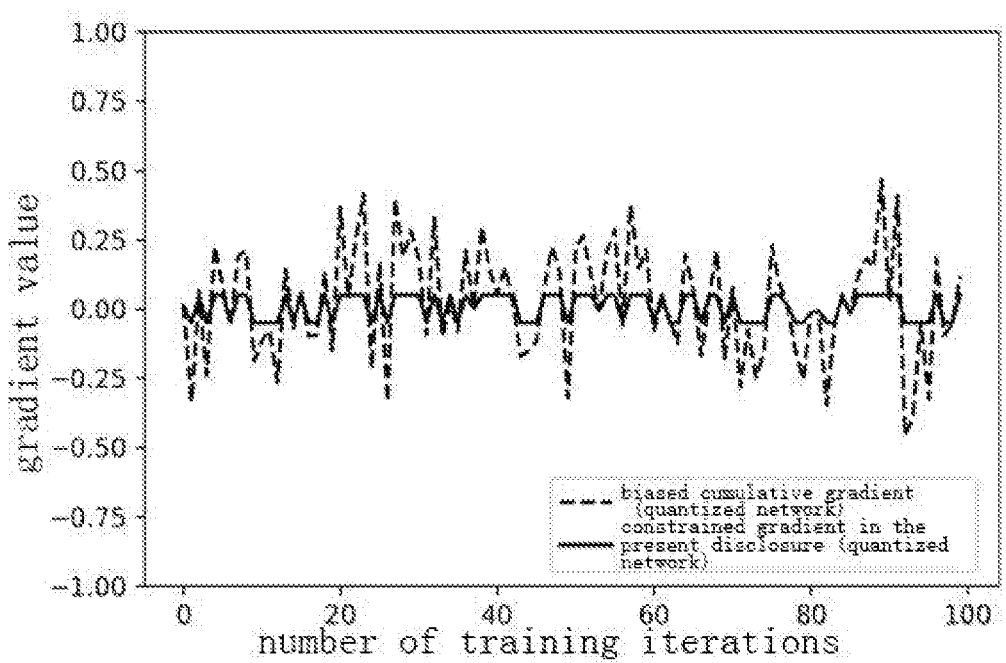

The constraint processing of the gradient in step S105 can overcome the gradient distortion caused by the quantization error, and the constrained gradient can be substantially close to the actual gradient of the weight in the network model under high accuracy. As shown in FIG. 9 (a), the gradient under the high-accuracy network is a normal gradient, and the gradient value estimated under the quantized network model (low accuracy) has a significant deviation from the gradient value under the high-accuracy network model, that is, a biased gradient. Referring again to FIG. 9 (b), the biased cumulative gradient value estimated under the quantized network model also has a significant deviation from the gradient value based on the solution of this embodiment also under the quantized network model, but the gradient value based on the solution of this embodiment under the quantized network model is close to the gradient value under the high-accuracy network model. Therefore, this embodiment can better constrain the gradient distortion caused by the quantization error, and the problem of distortion accumulation will not occur after multiple trainings.

Step S106: The weight is updated using the constrained gradient.

An optional manner is to use formula (6) to update the weights. Since the gradient in this step is the gradient after the constraint processing, formula (6) can be transformed into formula (13).

$$W_{t+1} = W_t - \eta_t m_t / \sqrt{\tilde{V}_t} \quad \text{formula (13)}$$

Wherein $m_t$ can be calculated according to formula (3); preferably, $\beta_1$ in formula (3) can be a constant 0.9, or can be calculated and determined according to the calculation accuracy of the neural network based on the manner shown in formula (8).

Since the gradients of the weights are optimized twice in steps S103 and S105, in this step S106, the weights are updated using the optimized gradients, that is, the training of the neural network model, so that the performance of the neural network model with arbitrary calculation accuracy can approach the expected performance. To demonstrate the methods of the present disclosure, the theorems and inferences are provided as follows.

Theorem 4: Supposing that there is a quantization scale factor $\alpha$, a binary quantization function sign(w), and a quantization scale domain $\overline{w}_{v}$. Letting $\{\tilde{w}_t\}$ and $\{v_t\}$ be sequence functions (based on Theorem 1), wherein $\beta_1 = \beta_{11}$, $\beta_{1t} < \beta_1$; $\forall t \in [T]$, and $\beta_1/\sqrt{\beta_2} < 1$. It is supposed that $\|\tilde{w}_x - \tilde{w}_y\|_\infty ! \leq D_\infty$; $\forall \tilde{w}_x, \tilde{w}_y \in F$ and $\|f_t(\tilde{w})\| \leq G_\infty$, $\forall t \in [T]$ and $\tilde{w} \in F$. It is supposed that $\|f(\tilde{w}_x) - f(\tilde{w}_y)\| \leq C(\alpha)\|\tilde{w}_x - \tilde{w}_y\| \leq C(\alpha)D_\infty$ and $\|C(\alpha)\| \leq L_\infty$. For $\tilde{w}_t$, with the method of the present disclosure, there may be a constraint solution shown in the following formula (14):

$$R_T \leq \frac{D_\infty^2 \sqrt{T}}{\eta(1-\beta_1)} \sum_{i=1}^d \hat{v}_{T,i}^{1/2} + \frac{D_\infty^2}{2(1-\beta_1)} \sum_{t=1}^T \sum_{i=1}^d \frac{\beta_{1t} \hat{v}_{T,i}^{1/2}}{\eta_t} + \quad \text{formula (14)}$$

$$\frac{\eta\sqrt{1+\log T}}{(1-\beta_1)^2(1-\beta_1/\sqrt{\beta_2})\sqrt{(1-\beta_2)}} \sum_{i=1}^d \|\alpha_{1:T,i}\|_2 +$$

$$L_\infty D_\infty \sum_{t=1}^T \sqrt{\|w_t - \alpha^*\|\sqrt{\hat{v}_{t-1}}}$$

According to the above constraint solution, the following can be inferred:

Inference 1: It is supposed that $\beta_{1t} = \beta_{1\lambda}{}^{t-1}$ in Theorem 4, wherein $\lambda = \beta_1/\sqrt{\beta_2}$, formula (15) can be obtained.

$$R_T \leq \frac{D_\infty^2 \sqrt{T}}{\eta(1-\beta_1)} \sum_{i=1}^d \hat{v}_{T,i}^{1/2} + \frac{\beta_1 D_\infty^2 G_\infty}{2(1-\beta_1)(1-\beta_1/\sqrt{\beta_2})^2} + \quad \text{formula (15)}$$

$$\frac{\eta\sqrt{1+\log T}}{(1-\beta_1)^2(1-\beta_1/\sqrt{\beta_2})\sqrt{(1-\beta_2)}} \sum_{i=1}^d \|\alpha_{1:T,i}\|_2 + L_\infty D_\infty \sqrt{D_\infty + \alpha^2 d_{\overline{w}}^2}$$

Wherein the details of the above Theorem 4 and Inference 1 can be found in the corresponding part of the <Theorems and inferences in the exemplary embodiments> in the specification.

Step S107: Whether there is a weight which is not updated; if yes, step S103 is performed to continue updating other weights; otherwise, this training is ended, and the process proceeds to step S101.

It should be noted that the hyper-parameters of the network model in the first embodiment may be stored in advance, or acquired from the outside through the network, or obtained by local operation, which is not limited in the present disclosure. The hyper-parameters include, but are not limited to, the calculation accuracy of the network model, the learning rates $\eta_t$, $\beta_1$, $\beta_2$, and the like.

In this embodiment, steps S101 to S107 are repeatedly performed until the training end condition is satisfied. Here, the training end condition may be any condition set in advance, the difference value between the actual output result and the expected output result of the neural network model does not exceed a predetermined threshold, or the number of trainings of the network model reaches a predetermined number of times, or the like.

Through the solution of the first exemplary embodiment of the present disclosure, even in a case where the calculation accuracy of the neural network model is lower, a larger quantization error is generated, and thus the gradient of the weight is distorted. However, the gradient that has been distorted is constrained by using the set constraint threshold range in the present disclosure, so that the step size obtained from the gradient is appropriate. Referring to FIG. 6 (c), the case where the optimal solution cannot be achieved due to gradient distortion shown in FIG. 6 (b) does not occur.

Second Exemplary Embodiment

Based on the foregoing first exemplary embodiment, the second exemplary embodiment of the present disclosure describes a network model training system, which includes a terminal, a communication network, and a server. The terminal and the server communicate through the communication network. The server uses the locally stored network model to train the network model stored in the terminal online, so that the terminal can use the trained network model to perform the real-time business. Each part in the training system of the second exemplary embodiment of the present disclosure is described below.

The terminal in the training system may be an embedded image acquisition device such as a security camera or the like, or a device such as a smart phone or PAD, or the like. Of course, the terminal may not be a terminal with a weak computing capability such as an embedded device or the like, but other terminals with strong computing capabilities. The number of terminals in the training system can be determined according to actual needs. For example, if the training system is to train security cameras in the shopping mall, all security cameras in the shopping mall can be considered as terminals. At this time, the number of terminals in the training system is fixed. For another example, if the training system is to train the smartphones of users in the shopping mall, all the smartphones connected to the wireless local area network of the shopping mall can be regarded as terminals. At this time, the number of terminals in the training system is not fixed. In the second exemplary embodiment of the present disclosure, the type and number of terminals in the training system are not limited, as long as the network model can be stored and trained in the terminal.

The server in the training system can be a high-performance server with strong computing capability, such as a cloud server. The number of servers in the training system can be determined according to the number of terminals served by the servers. For example, if the number of terminals to be trained in the training system is small or the geographical range of the terminal distribution is small, the number of servers in the training system is small, such as only one server. If the number of terminals to be trained in the training system is large or the geographical range of the terminal distribution is large, then the number of servers in the training system is large, such as establishing a server cluster. In the second exemplary embodiment of the present disclosure, the type and number of servers in the training system are not limited, as long as the server can store at least one network model and provide information for training the network model stored in the terminal.

The communication network in the second exemplary embodiment of the present disclosure is a wireless network or a wired network for implementing information transfer between the terminal and the server. Any network currently available for uplink/downlink transmission between the network server and the terminal can be used as the communication network in this embodiment, and the second exemplary embodiment of the present disclosure does not limit the type and communication manner of the communication network. Of course, the second exemplary embodiment of the present disclosure is not limited to other communication manners. For example, a third-party storage area is allocated for this training system. When the terminal and the server want to transfer information to each other, the information to be transferred is stored in the third-party storage area. The terminal and the server periodically read the information in the third-party storage area to realize the information transfer between them.

Figure 10:
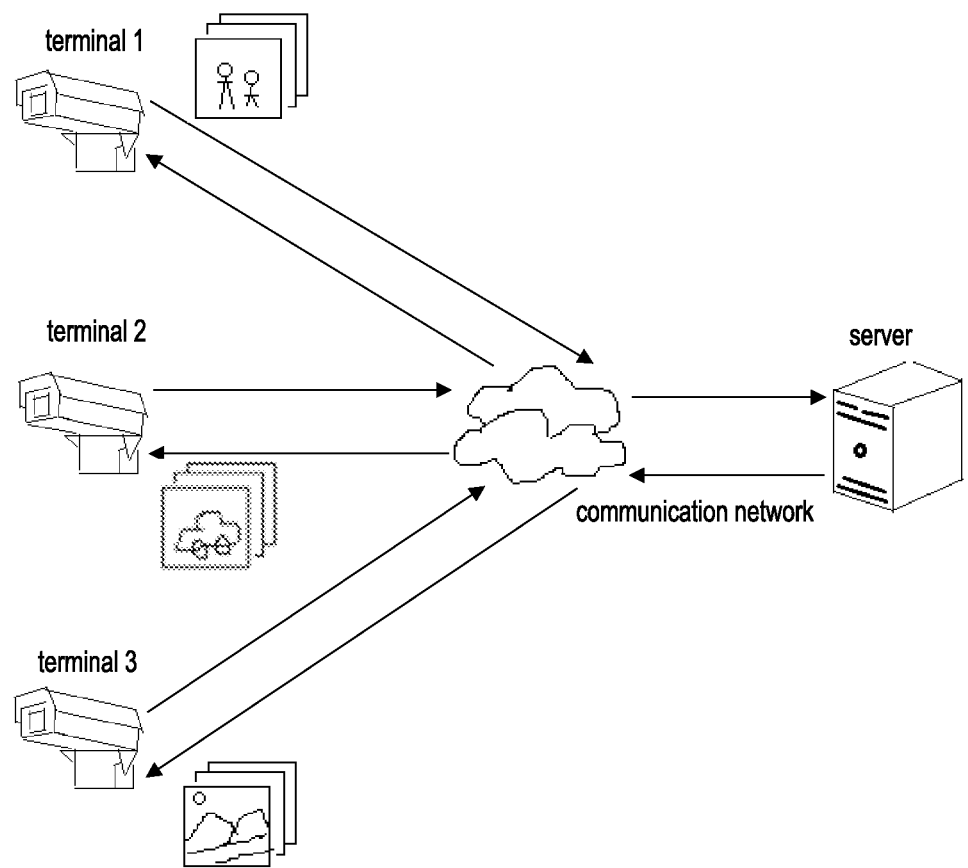
FIG. 10 illustrates a schematic diagram of a training system of a second exemplary embodiment of the present disclosure.

The online training process of the training system of the second exemplary embodiment of the present disclosure will be described in detail with reference to FIG. 10. FIG. 10 shows an example of a training system. It is assumed that the training system includes three terminals (terminal 1 to terminal 3) and one server. The terminal can perform real-time shooting, in which the terminal 1 takes a group of human pictures, the terminal 2 takes a group of car pictures, and the terminal 3 takes a group of landscape pictures. It is assumed that a network model that can be trained and can process pictures is stored in the three terminals respectively, and the same network model is stored in the server. The training process of the training system is described below.

Step S201: The terminal initiates a training request to the server via the communication network.

The terminal initiates a training request to the server through the communication network, and the request includes information such as the terminal identification or the like. The terminal identification is information that uniquely indicates the identity of the terminal (for example, ID or IP address of the terminal, or the like).

This step S201 is described by taking one terminal initiating a training request as an example. Of course, multiple terminals may initiate a training request in parallel. The processing procedure for multiple terminals is similar to the processing procedure for one terminal, and will be omitted here.

Step S202: The server receives the training request.

The training system shown in FIG. 10 includes only one server. Therefore, the communication network can transfer a training request initiated by the terminal to the server. If the training system includes multiple servers, the training request can be transferred to a relatively idle server according to the idle status of the server.

Step S203: The server responds to the received training request.

The server determines the terminal that initiated the request according to the terminal identification included in the received training request, and thus determines the network model to be trained stored in the terminal. One optional manner is that the server determines the network model to be trained stored in the terminal that initiated the request according to the comparison table between the terminal and the network model to be trained; another optional manner is that the training request includes information on the network model to be trained, and the server can determine the network model to be trained based on the information: Here, determining the network model to be trained includes, but is not limited to, determining information representing the network model such as a network architecture, a hyper-parameter or the like of the network model.

After the server determines the network model to be trained, the method of the first exemplary embodiment of the present disclosure may be used to train the network model stored in the terminal that initiated the request using the same network model stored locally by the server. Specifically, the server updates the weights in the network model locally according to the method in step S101 to step S106 in the first exemplary embodiment, and transfer the updated weights to the terminal, so that the terminal synchronizes the network model to be trained stored in the terminal according to the updated weights that have been received. Here, the network model in the server and the network model trained in the terminal may be the same network model, or the network model in the server is more complicated than the network model in the terminal, but the outputs of the two are close. The disclosure does not limit the types of the network model used for training in the server and the trained network model in the terminal, as long as the updated weights output from the server can synchronize the network model in the terminal to make the output of the synchronized network model in the terminal closer to the expected output.

In the training system shown in FIG. 10, the terminal actively initiates a training request. Optionally, the second exemplary embodiment of the present disclosure is not limited to the case where the server broadcasts a query message, the terminal responds to the query message, and then the above training process is performed.

Through the training system described in the second exemplary embodiment of the present disclosure, the server can perform online training on the network model in the terminal, which improves flexibility of the training, meanwhile greatly enhances the business processing capability of the terminal and expands the business processing scenario of the terminal. The above second exemplary embodiment describes the training system by taking the online training as an example, but the present disclosure is not limited to the offline training process, and will not be repeated here.

Third Exemplary Embodiment

Figure 11:
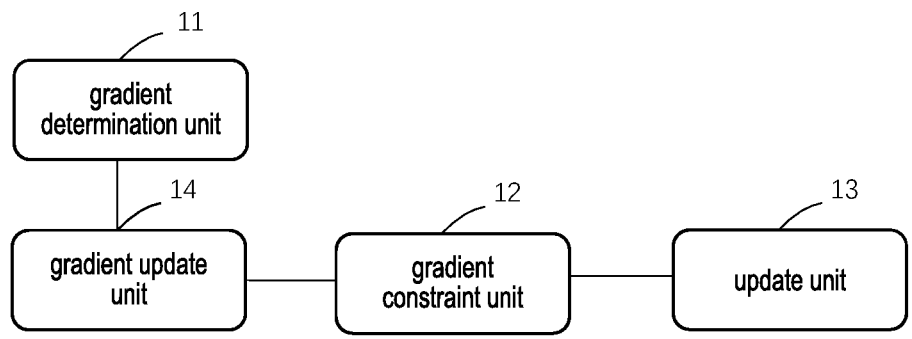
FIG. 11 illustrates a schematic diagram of a training apparatus of a third exemplary embodiment of the present disclosure.

The third exemplary embodiment of the present disclosure describes a training apparatus for a neural network model, and the apparatus can execute the training method described in the first exemplary embodiment. Moreover, the apparatus, when applied to an online training system, may be an apparatus in the server described in the second exemplary embodiment. The software structure of the apparatus will be described in detail below with reference to FIG. 11.

The training apparatus in the third embodiment includes a gradient determination unit 11, a gradient constraint unit 12, and an update unit 13, wherein the gradient determination unit 11 is used to determine gradients of weights in the network model during a back propagation; the gradient constraint unit 12 is used to perform, for at least one of the gradients determined by the gradient determination unit 11, the following processing: determining whether the gradient is within a constraint threshold range, and constraining a gradient exceeding the constraint threshold range to be a value within the constraint threshold range, wherein the constraint threshold range is determined according to the number of training iterations and calculation accuracy of the neural network model; and the update unit 13 is used to update weights by using constrained gradients.

Preferably, the gradient constraint unit 12 is further used to: determine a quantization error of each weight in the neural network model, and use the maximum quantization error as a quantization error of the neural network model; and, use the quantization error and the number of training iterations of the neural network model to determine a constraint threshold range, wherein the determined constraint threshold range constrains the at least one gradient. That is, a common constraint threshold range is set for the entire neural network model, which is used to constrain all gradients to be constrained.

Preferably, the gradient constraint unit 12 is further used to: determine, for at least one weight in the network model, a quantization error of the weight; and determine a constraint threshold range by using the quantization error of the weight and the number of training iterations, wherein the determined constraint threshold range constrains the gradient of the weight. In other words, a respectively independent constraint threshold range is set for each weight, which is only used to constrain the gradient of the corresponding weight.

The training apparatus further includes a gradient update unit 14 which is used to determine, for at least one weight in the network model, a weighted maximum value from the gradient determined by the weight in this training and the constrained gradient of the weight in the previous multiple trainings; the gradient constraint unit 12 is used to determine whether the weighted maximum value is within a constraint threshold range and constrain a weighted maximum value that exceeds the constraint threshold range to be a value within the constraint threshold range.

The training apparatus of this embodiment also has a module that implements the functions (such as a function of identifying received data, a data encapsulation function, a network communication function and so on, which are not described herein again) of a server in the training system.

Figure 12:
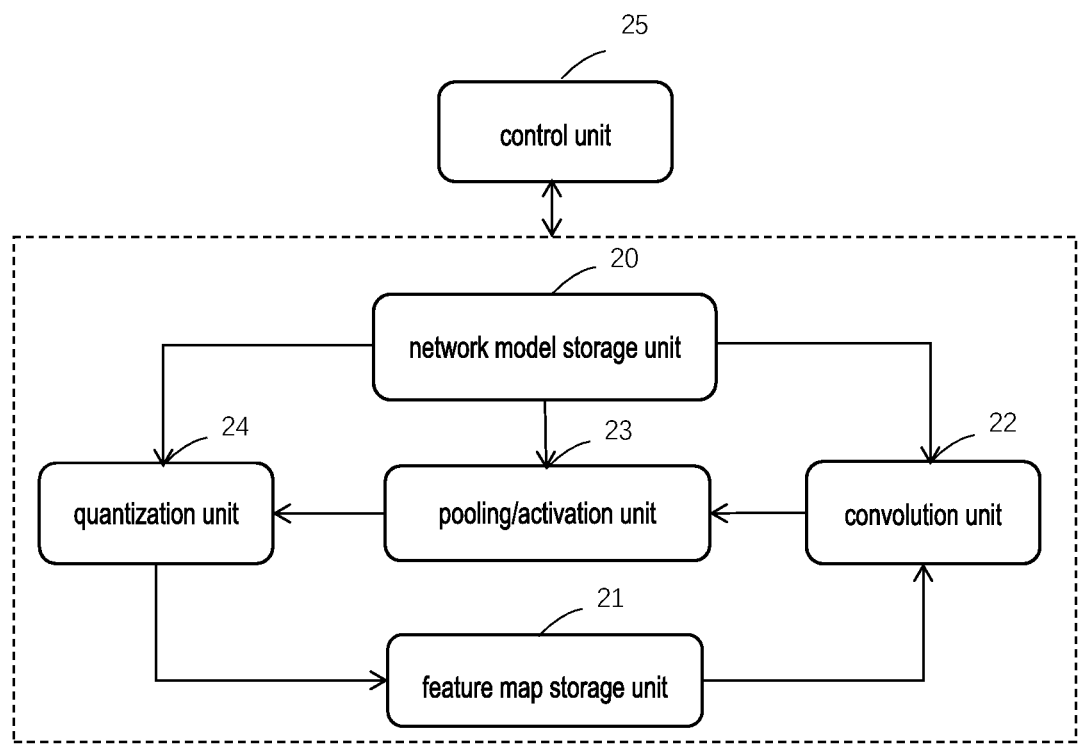
FIG. 12 illustrates a schematic diagram of a hardware environment of the training apparatus of the third exemplary embodiment of the present disclosure.

The training apparatus of the third exemplary embodiment of the present disclosure may be operated in the structure shown in FIG. 12. When a data set is received by the structure shown in FIG. 12, the received data set may be processed. If the difference value between the final output result and the expected output result is large, the training method described in the first embodiment is performed. Referring to FIG. 12, the hardware structure of the training apparatus includes a network model storage unit 20, a feature map storage unit 21, a convolution unit 22, a pooling/activation unit 23, a quantization unit 24, and a control unit 25. Each unit is described below respectively.

The network model storage unit 20 stores hyper-parameters of the network model to be trained described in the first exemplary embodiment of the present disclosure, including but not limited to, structural information of the network model, and information required in operation performed in each layer (such as the calculation accuracy of the network model, the learning rates $\eta t$, $\beta_1$ and $\beta_2$, etc.). The feature map storage unit 21 stores feature map information required by each layer in the network model during operation.

In the forward propagation, the convolution unit 22 is used to perform convolution processing on the data set according to the information input by the network model storage unit 20 and the information input by the feature map storage unit 21 (such as the input feature map of the i-th layer). In the back propagation, according to the method of the first embodiment, the constraint threshold range for the constraint is determined according to the calculation accuracy of the weights in the convolutional layer and the number of trainings, and the gradient of the weights in the convolutional layer is constrained. The weights in the convolutional layer are updated by using the constrained gradient.

Other units such as the pooling/activation unit 23, the quantization unit 24 and so on are not necessary units to implement the present disclosure. FIG. 12 illustrates the case where the pooling/activation unit 23 and the quantization unit 24 are included. Of course, the training apparatus may not include the pooling/activation unit 23 and the quantization unit 24, or the training apparatus may further include other units capable of performing regularization processing and scaling processing, which are not described herein again. If the layers managed by these units contain weights, the weights in the layers can be updated during back propagation according to the method of the first embodiment.

The control unit 25 controls the operations of the network model storage unit 20 to the quantization unit 24 by outputting control signals to each unit in FIG. 12.

Figure 13:
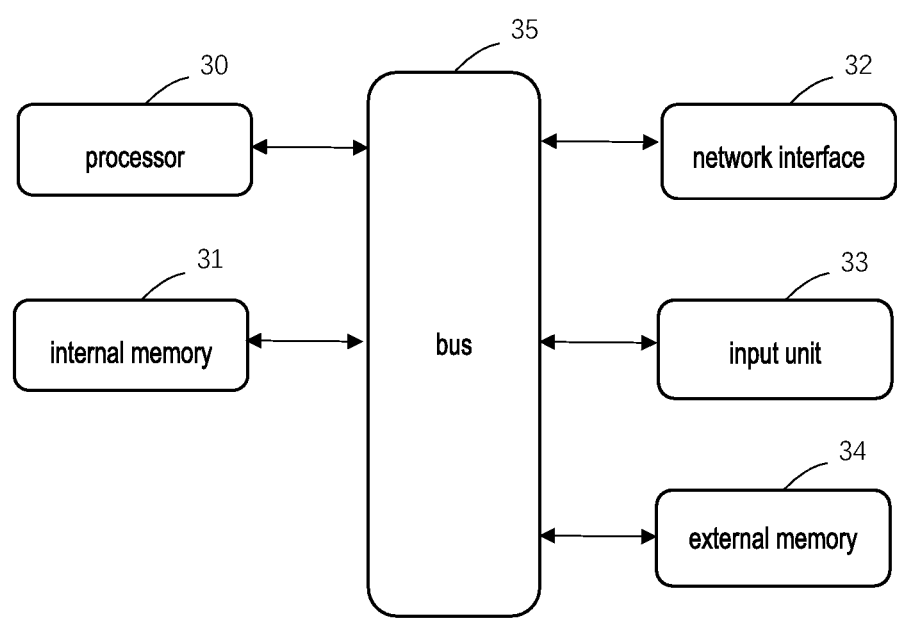
FIG. 13 illustrates a schematic diagram of an application environment of the training apparatus according to the third exemplary embodiment of the present disclosure.

The environment to which the training apparatus for the neural network model in the third exemplary embodiment of the present disclosure is applied is described below with reference to FIG. 13. In the application environment shown in FIG. 13, a device including a processor 30, an internal memory 31, a network interface 32, an input unit 33, an external memory 34, and a bus 35 supports the normal operation of the training apparatus.

The processor 30 may be a CPU or a GPU, which is used to perform overall control on the training apparatus. The internal memory 31 includes a random access memory (RAM), a read-only memory (ROM), and the like. The RAM can be used as a main memory, a work area, and the like of the processor 30. The ROM may be used to store control program of the processor 30, and may also be used to store files or other data to be used when the control program is operated. The network interface 32 may be connected to a network and implement network communication. The input unit 33 controls input from devices such as a keyboard, a mouse, and the like. The external memory 34 stores startup program, various applications, and the like. The bus 35 is used to connect the above components.

After the training of the neural network model by using the solution of the first exemplary embodiment of the present disclosure is implemented, the application business may be executed using the trained network model. Taking a case where a network model trained according to the manner in the first exemplary embodiment is stored in a security camera as an example, it is assumed that the security camera is to execute a target detection application, after the security camera takes a picture as a data set, the taken picture is input into the network model, so that the picture is calculated in each layer from the top to the bottom in the network model, and the target detection result is output. The present disclosure is also not limited to further performing post-processing on the output results, such as data classification and the like.

Corresponding to the application method described herein, the present disclosure further describes an application apparatus of a neural network model, the application apparatus includes: a storage module for storing a trained network model; a receiving module for receiving a data set which is required to correspond to a task which can be executed by the stored network model; and a processing module for performing operations on the data set from top to bottom in each layer in the stored network model and outputting a result.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Embodiments of the present disclosure can also be realized by the following method, that is, a software (program) that executes the functions of the above-described embodiments is supplied to a system or apparatus through a network or various storage medium, a computer of the system or apparatus, or a central processing unit (CPU) and a micro processing unit (MPU), reads and executes the program.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

<Theorems and Inferences in the Exemplary Embodiments>
Lemmas Needed for the Proof:

Lemma 1. For any $w_t \in R^d$ and convex functional $F \subset R^d$, it is assumed that $c_1 = \min_{\tilde{w}_t} \|w_t - \tilde{w}_t\|$ and $\tilde{w}_t = \alpha_t \, \text{sign}(w_t)$, wherein $\alpha_t \in R$, for any $t \in N$, $\alpha_t \geq 0$.

Proof. Because $c_1 = \min_{\tilde{w}_t} \|w_t - \tilde{w}_t\|$ and $\tilde{w}_t = \alpha_t \, \text{sign}(w_t)$, formula (16) can be obtained:

$$c_1 = \min_{\tilde{w}_t \in F} \|w_t - \alpha_t \, \text{sign}(w_t)\|. \quad \text{formula (16)}$$

By rearranging, given $t \in N$, we assume that $\alpha_t < 0$, formula (17) can be obtained:

$$\alpha_t = \frac{1}{d} \sum_{i=0}^{d} \frac{\omega_{t,i} - c_1 \mathbb{1}}{\text{sign}(\omega_{t,i})} < 0. \quad \text{formula (17)}$$

According to the projection property $\tilde{w}_t \in F$ and the convex functional F, formula (18) can be obtained:

$$\sum_{i=0}^{d} \left( |\omega_{t,i}| - \frac{c_1 \mathbb{1}}{\text{sign}(\omega_{t,i})} \right) \geq 0. \quad \text{formula (18)}$$

It is easy to know that because formula (18) does not hold, formula (18) is true only when $\alpha_t > 0$.

Lemma 2. It is supposed that $v_t = \beta_2 v_{t-1} + (1-\beta_2) g_t^2$ and $v_0 = 0$ and $0 \leq \beta_2 < 1$. Given $\|g_t\| < G_\infty$, formula (19) can be obtained:

$$\sum_{t=1}^{T} \|v_t\| \leq \sum_{t=1}^{T} G_\infty^2. \quad \text{formula (19)}$$

If $\beta_2 = 0$ and $v_t = g_t^2$, the above assumptions are satisfied. In addition, if $0 < \beta_2 < 1$, formula (20) can be obtained:

$$\|v_t\| = \beta_2 \|v_{t-1}\| + (1-\beta_2)\|g_t^2\| \leq \beta_2 \|v_{t-1}\| + (1-\beta_2)\|G_\infty^2\|. \quad \text{formula (20)}$$

Formula (20) comes from the gradient constraint $\|g_t\| < G_\infty$. At the same time, because $v_0 = 0$, the formula (21) can be obtained:

$$\|v_t\| \leq (1-\beta_2) \sum_{i=1}^{t} \|g_i^2\| \beta_2^{t-i}. \quad \text{formula (21)}$$

Formula (21) is summed, wherein $t = [1, T]$, and formula (22) can be obtained:

$$\sum_{t=1}^{T} \|v_t\| \leq (1-\beta_2) \sum_{t=1}^{T} \sum_{i=1}^{t} \|g_i^2\| \beta_2^{t-i} = \quad \text{formula (22)}$$

$$(1-\beta_2) \sum_{i=1}^{T} \sum_{t=i}^{T} \|g_i^2\| \beta_2^{t-i} \leq \sum_{t=1}^{T} \|g_t\|^2 \leq \sum_{t=1}^{T} G_\infty^2.$$

Formula (22) comes from the constraints of formula (23):

$$\sum_{i=0}^{N} \beta_2^i \leq \sum_{i=0}^{\infty} \beta_2^i = \frac{1}{1-\beta_2}. \quad \text{formula (23)}$$

Lemma 3. For the parameter settings and conditions assumed in Theorem 3, formula (24) can be obtained:

$$\sum_{t=1}^{T} \frac{\eta_t}{2(1-\beta_{1t})} \|\hat{v}_t^{-1/4} m_t\|^2 + \sum_{t=1}^{T} \frac{\eta_t \beta_{1t}}{2(1-\beta_{1t})} \|\hat{v}_t^{-1/4} m_{t-1}\|^2 \leq \quad \text{formula (24)}$$

$$\frac{\eta \sqrt{1+\log T}}{(1-\beta_1)^2 (1-\gamma) \sqrt{(1-\beta_2)}} \sum_{i=1}^{d} \|\alpha_{1:T,i}\|_2 \varpi$$

Referring to the proof of formula (24) in formula (25).

$$\sum_{t=1}^{T} \frac{\eta_t}{2(1-\beta_{1t})} \|\hat{v}_t^{-1/4} m_t\|^2 + \sum_{t=1}^{T} \frac{\eta_t \beta_{1t}}{2(1-\beta_{it})} \|\hat{v}_t^{-1/4} m_{t-1}\|^2 \leq \quad \text{formula (25)}$$

$$\frac{1}{2(1-\beta_1)} \left[ \sum_{t=1}^{T} \eta_t \|\hat{v}_t^{-1/4} m_t\|^2 + \sum_{t=1}^{T} \eta_t \|\hat{v}_t^{-1/4} m_{t-1}\|^2 \right] \leq$$

$$\frac{1}{(1-\beta_1)} \left[ \sum_{t=1}^{T-1} \eta_t \|\hat{v}_t^{-1/4} m_t\|^2 + \eta \sum_{i=1}^{d} \frac{\left(\sum_{j=1}^{T} \prod_{k=1}^{T-j} \beta_{1(T-k+1)} \alpha_{j,i} \varpi\right)^2}{\sqrt{T\left((1-\beta_2) \sum_{j=1}^{T} \beta_2^{T-j} \alpha_{j,i}^2 \varpi\right)}} \right] \leq$$

$$\frac{1}{(1-\beta_1)} \left[ \sum_{t=1}^{T-1} \eta_t \|\hat{v}_t^{-1/4} m_t\|^2 + \right.$$

$$\left. \eta \sum_{i=1}^{d} \frac{\left(\sum_{j=1}^{T} \prod_{k=1}^{T-j} \beta_{1(T-k+1)}\right)\left(\sum_{j=1}^{T} \prod_{k=1}^{T-j} \beta_{1(T-k+1)} \alpha_{j,i} \varpi\right)^2}{\sqrt{T\left((1-\beta_2) \sum_{j=1}^{T} \beta_2^{T-j} \alpha_{j,i}^2 \varpi\right)}} \right] \leq$$

$$\frac{1}{(1-\beta_1)} \left[ \sum_{t=1}^{T-1} \eta_t \|\hat{v}_t^{-1/4} m_t\|^2 + \frac{\eta}{(1-\beta_1)\sqrt{T(1-\beta_1)}} \sum_{i=1}^{d} \sum_{j=1}^{T} \frac{\beta_1^{T-j}}{\sqrt{\beta_2^{T-j}}} \alpha_{j,i} \right]$$

According to $\beta_{1t} < 1_t < 1$, the first inequality in formula (25) can be proved. According to the definition of the maximum value in $\alpha_{T,i}v_{T,i}$ before the current iteration step and the algorithm 1 described later, the second inequality in formula (25) can be proved. According to the Cauchy-Schwarz inequality, the third inequality in formula (25) can be proved. According to $\beta_{1k}<\beta_1$ (wherein $k\in[T]$) and $\Sigma_{j=1}^T \beta_1^T < 1/(1-\beta_1)$, the fourth inequality in formula (25) can be proved. Formula (26) can be further obtained:

$$\sum_{t=1}^{T} \frac{\eta_t}{2(1-\beta_{1t})} \|\hat{V}_t^{-1/4} m_t\|^2 + \sum_{t=1}^{T} \frac{\eta_t \beta_{1t}}{2(1-\beta_{1t})} \|\hat{V}_t^{-1/4} m_{t-1}\|^2 \leq \quad \text{formula (26)}$$

$$\sum_{t=1}^{T} \frac{\eta}{(1-\beta_1)^2 \sqrt{t(1-\beta_1)}} \sum_{i=1}^{d} \sum_{j=1}^{T} \frac{\beta_1^{T-j}}{\sqrt{\beta_2^{T-j}}} \alpha_{j,i} \leq$$

$$\frac{\eta}{(1-\beta_1)^2(1-\beta_1/\sqrt{\beta_2})\sqrt{(1-\beta_2)}} \sum_{i=1}^{d} \|\alpha_{1:T,i}\|_2 \sqrt{\sum_{t=1}^{T} \frac{1}{t}} \leq$$

$$\frac{\eta\sqrt{1+\log T}}{(1-\beta_1)^2(1-\beta_1/\sqrt{\beta_2})\sqrt{(1-\beta_2)}} \sum_{i=1}^{d} \|\alpha_{1:T,i}\|_2$$

Because formula (27) holds, the last inequality in formula (26) also holds.

$$\sum_{t=1}^{T} \frac{1}{t} \leq (1+\log T) \quad \text{formula (27)}$$

Proof of Theorem 1.

It is considered the following settings: $f_t$ is a linear function containing implicit quantized weights, and the domain of definition of weights $F=[-1, 1]$. Specifically, we consider the sequence of functions shown in the following formula (28):

$$f_t(\omega) = \begin{cases} -1 & \text{for } \tilde{\omega} = -1; \\ \tilde{\omega} & \text{for } -1 < \tilde{\omega} \leq 1 \text{ and } t \mod C = 1; \\ -\tilde{\omega} & \text{for } -1 < \tilde{\omega} \leq 1 \text{ and } t \mod C = 2; \\ 0 & \text{otherwise}, \end{cases} \quad \text{formula (28)}$$

Wherein $\tilde{w}_t = \alpha_t w_b$ is the implicit quantization weight, the purpose of which is to minimize the quantization error, that is, to obtain $\min_{\tilde{w}_t \in F} \|w_t - \tilde{w}_t\|$. Formula (28) can be transformed into formula (29):

$$f_t(\omega) = \begin{cases} -1 & \text{for } \alpha\omega_b = -1; \\ \alpha\omega_b & \text{for } -1 < \alpha\omega_b \leq 1 \text{ and } t \mod C = 1; \\ -\alpha\omega_b & \text{for } -1 < \alpha\omega_b \leq 1 \text{ and } t \mod C = 2; \\ 0 & \text{otherwise}, \end{cases} \quad \text{formula (29)}$$

Wherein, for $C \in N$, the following formula (30) is satisfied:

$$\beta_2^{C-2} \geq \frac{\alpha_t^3(1-\beta_2)}{2\alpha_{t+1} - 2\alpha_t \beta_2} \quad \text{formula (30)}$$

Since the solving problem is a one-dimensional problem, $\odot$ can be omitted in order to simplify the representation. At the same time, the coordinate index can be further omitted.

For formula (29), it is not difficult to see that when $\tilde{w}=-1$, the smallest regret is provided.

Since the ADAM processing is performed on formula (29), formula (31) can be obtained:

$$\beta_1 = 0, \frac{\beta_1^2}{\beta_2} < 1 \text{ and } \eta_t = \frac{\eta}{\sqrt{t}}. \quad \text{formula (31)}$$

F has an $L_\infty$ domain limitation. At this time, all parameter settings satisfy the Adam algorithm.

In order to provide a proof of the theorem, an arbitrary learning rate $\eta$ is supposed and there is $\tilde{w}_t > 0$, wherein $\forall t \in N$, and meanwhile, there further is $\tilde{w}_{Ct+3}=1$, wherein $\forall C \in N \cup \{0\}$. The subscripts of the parameters can be rearranged. For any C step size, assuming $t \in N$, there can be $\tilde{w}_{Ct+1} \geq 0$. Our goal is to provide $\tilde{w}_{Ct+i} > 0$, wherein $\forall i \in N \cap [2, C+1]$. It is not difficult to see that when $\tilde{w}_{Ct+1} > 1$ holds, the above assumption holds. Further assuming that $\tilde{w}_{Ct+1} \leq 1$, because $w_b = \text{sign}(w)$ and $\tilde{w}_t > 0$ hold, the corresponding gradient is observed as shown in formula (32):

$$\nabla f_i(w) = \begin{cases} \alpha_t & \text{for } -1 < \alpha \leq 1 \text{ and } i \mod C = 1; \\ -\alpha_t & \text{for } -1 < \alpha \leq 1 \text{ and } i \mod C = 2; \\ 0 & \text{otherwise}, \end{cases} \quad \text{formula (32)}$$

For (Ct+1) times of update of the ADAM algorithm, formula (33) can be obtained:

$$\hat{w}_{Ct+2} = \hat{w}_{Ct+1} - \frac{\eta}{\sqrt{Ct+1}} \frac{\alpha_{Ct}}{\sqrt{\beta_2 v_{Ct} + \alpha_{Ct}^2(1-\beta_2)}} \quad \text{formula (33)}$$

When $\beta_2 v_{Ct} \geq 0$, where $\forall t \in N$ holds, formula (34) can be obtained:

$$\frac{\eta}{\sqrt{Ct+1}} \frac{\alpha_{Ct}}{\sqrt{\beta_2 v_{Ct} + \alpha_{Ct}^2(1-\beta_2)}} \leq \frac{\eta}{\sqrt{Ct+1}} \frac{\alpha_{Ct}}{\sqrt{\alpha_{Ct}^2(1-\beta_2)}} = \quad \text{formula (34)}$$

$$\frac{\eta}{\sqrt{Ct+1}} \frac{\alpha_{Ct}}{\sqrt{(1-\beta_2)}} < 1$$

$$0 < \eta < \frac{1}{\sqrt{(Ct+1)(1-\beta_2)}}$$

holds, and the second inequality of the above formula (34) holds.

Therefore, $0 < \hat{w}_{Ct+2} < 1$ and $\tilde{w}_{Ct+2} = \hat{w}_{Ct+2}$ can be obtained.

In order to complete the above proof, we need to prove that $\tilde{w}_{Ct+3} = 1$. In order to prove the theorem, when $\hat{w}_{Ct+3} \geq 1$, we can get: when $\tilde{w}_{Ct+3} = \Pi_F(\hat{w}_{Ct+3})$ and $F=[-1, 1]$ (wherein F is a simple Euclidean mapping) hold, $\tilde{w}_{Ct+3}=1$ holds.

It is considered the following situation again, if $0<\tilde{w}_{Ct+2}<1$, when (Ct+2)-th update is performed, formula (35) can be obtained:

$$\hat{w}_{Ct+3} = \hat{w}_{Ct+2} + \frac{\eta}{\sqrt{Ct+2}} \frac{\alpha_{Ct+1}}{\sqrt{\beta_2 v_{Ct+1} + \alpha_{Ct+1}^2(1-\beta_2)}} = \quad \text{formula (35)}$$

$$\hat{w}_{Ct+1} - \frac{\eta}{\sqrt{Ct+1}} \frac{\alpha_{Ct}}{\sqrt{\beta_2 v_{Ct} + \alpha_{Ct}^2(1-\beta_2)}} +$$

$$\frac{\eta}{\sqrt{Ct+2}} \frac{\alpha_{Ct+1}}{\sqrt{\beta_2 v_{Ct+1} + \alpha_{Ct+1}^2(1-\beta_2)}}$$

Since $\hat{w}_{Ct+2} = \tilde{w}_{Ct+2}$ holds, the second equation of formula (35) also holds. In order to prove that $\tilde{w}_{Ct+3} \geq 1$, we need to prove the following formula (36):

$$\frac{\eta}{\sqrt{Ct+1}} \frac{\alpha_{Ct}}{\sqrt{\beta_2 v_{Ct} + \alpha_{Ct}^2(1-\beta_2)}} \leq \qquad \text{formula (36)}$$

$$\frac{\eta}{\sqrt{Ct+2}} \frac{\alpha_{Ct+1}}{\sqrt{\beta_2 v_{Ct+1} + \alpha_{Ct+1}^2(1-\beta_2)}}$$

Formula (37) can be obtained by rearranging formula (36):

$$\frac{\eta}{\sqrt{Ct+2}} \frac{\alpha_{Ct+1}}{\sqrt{\beta_2 v_{Ct+1} + \alpha_{Ct+1}^2(1-\beta_2)}} - \qquad \text{formula (37)}$$

$$\frac{\eta}{\sqrt{Ct+1}} \frac{\alpha_{Ct}}{\sqrt{\beta_2 v_{Ct} + \alpha_{Ct}^2(1-\beta_2)}} \geq$$

$$\frac{\eta \beta_2}{\sqrt{Ct+2} \sqrt{\beta_2 v_{Ct} + (1-\beta_2)} \sqrt{\beta_2 v_{Ct+1} + (1-\beta_2)}}$$

$$(\alpha_{Ct+1} v_{Ct} - \alpha_{Ct} v_{Ct+1}) \geq 0$$

The last inequality in formula (37) comes from the constraints of formula (38):

$$\alpha_{Ct+1} v_{Ct} - \alpha_{Ct} v_{Ct+1} = \alpha_{Ct+1} v_{Ct} - \alpha_{Ct}(\beta_2 v_{Ct} + (1-\beta_2)\alpha_{Ct}^2) \qquad \text{formula (38)}$$

$$= (\alpha_{Ct+1} - \alpha_{Ct}\beta_2)\left[(1-\beta_2)\left(\sum_{i=1}^{i}\beta_2^{Ct-1}\alpha_{Ct-1}^2 + \sum_{i=1}^{i}\beta_2^{Ct-2}\alpha_{Ct-2}^2\right)\right] -$$

$$(1-\beta_2)\alpha_{Ct}^3$$

$$\geq (\alpha_{Ct+1} - \alpha_{Ct}\beta_2)\left[(1-\beta_2)\left(\frac{\beta_2^{C-1}\alpha_{Ct}^2}{1-\beta_2^C} + \frac{\beta_2^{C-2}\alpha_{Ct}^2}{1-\beta_2^C}\right)\right] -$$

$$(1-\beta_2)\alpha_{Ct}^3$$

$$\geq 2(\alpha_{Ct+1} - \alpha_{Ct}\beta_2)\beta_2^{C-2}\alpha_{Ct}^2 - (1-\beta_2)\alpha_{Ct}^2 \geq 0$$

Because Lemma 1 and $F=[-1, 1]$, the second inequality in the above formula (38) holds.

Further, when $\tilde{w}_t \geq 0$ and $i \mod C$ is not equal to 1 or 2, because the gradient will be equal to 0, formula (39) can be obtained:

$$\tilde{w}_{Ct+4} = \hat{w}_{Ct+3} = \tilde{w}_{Ct+3} \geq 0 \qquad \text{formula (39)}$$

$$\tilde{w}_{Ct+5} = \hat{w}_{Ct+4} = \tilde{w}_{Ct+4} \geq 0$$

$$\ldots$$

$$\tilde{w}_{Ct+C+1} = \hat{w}_{Ct+C} = \tilde{w}_{Ct+C} \geq 0$$

Therefore, given $w_1 = 1$, formula (39) holds for all $\forall t \in N$, so formula (40) can be obtained:

$$\sum_{i=0}^{C} f_{kC+i}(w_{kC+i}) - \sum_{i=0}^{C} f_{kC+i}(-1) \geq 0 - (-C) = C \qquad \text{formula (40)}$$

Wherein $k \in N$. Therefore, for each C step, the regret of the ADAM algorithm is C. Therefore, $R_T/T \to 0$ holds when $T \to \infty$.

Proof of Theorem 1 is complete.

Proof of Theorem 2.

Theorem 2 generalizes the optimal setting of Theorem 1. Specifically, we can construct a binary optimization algorithm. We define a more general case, and design a constant deviation $\epsilon$ during the update process of the ADAM algorithm, see formula (41):

$$\hat{w}_{t+1} = \tilde{w}_t - \eta_t m_t / \sqrt{V_t + \epsilon} \mathbb{I}. \qquad \text{formula (41)}$$

We consider the following settings: $f_t$ is a linear function containing implicit quantized weights, and the domain of definition of weights $F = [-1, 1]$. Specifically, we consider the sequence of functions shown in the following formula (42):

$$f_t(\tilde{w}) = \begin{cases} -1 & \text{for } \tilde{w} = 1; \\ C\alpha_t & \text{for } -1 < \tilde{w} < 1 \text{ and } t \mod C = 1; \\ -\alpha_t & \text{for } -1 < \tilde{w} < 1 \text{ and } t \mod C \neq 1; \\ 0 & \text{otherwise,} \end{cases} \qquad \text{formula (42)}$$

Wherein, the constant $C \in N$ satisfies formula (43)

$$(1-\beta_1)\beta_1^{C-1} C \geq 1 - \beta_1^{C-1}, \qquad \text{formula (43)}$$

$$\beta_2^{(C-2)/2} C^2 \geq 1,$$

-continued $$\frac{3(1-\beta_1)}{2\sqrt{1-\beta_2}}\left(1 + \frac{\gamma(1-\gamma^{C-1})}{1-\gamma}\right) + \frac{\beta_1^{C/2-1}}{1-\beta_1} \geq \frac{C}{3}.$$

Wherein, $$Y = \frac{\beta_1}{\sqrt{\beta_2}} < 1.$$

C is a constant based on $\beta_1$, $\beta_2$, and $\alpha$.

If $m_{kC} \leq 0$ (wherein $\forall k \in N \cup \{0\}$) holds, in a more general case, $m_{kC+C}$ is as shown in formula (44):

$$m_{kC+C} = -\frac{1}{3}(1-\beta_1)\beta_1^{C-2} + 2(1-\beta_1)\beta_1^{C-1} + \beta_1^C m_{kC}. \qquad \text{formula (44).}$$

If $m_{kC} \leq 0$, $m_{kC+C} \leq 0$ is still satisfied.

At time iteration t, formula (45) can be obtained:

$$x_{t+C} \geq \min\{x_t + c_{t,1}\} \qquad \text{formula (45)}$$

When $c_t>0$, for a sequence function containing implicit quantized weights, formula (46) can be obtained:

$$\delta_t = -\frac{\eta}{\sqrt{t}} \frac{(1-\beta_1)\alpha_t C + \beta_1 m_t}{\sqrt{(1-\beta_2)\alpha_t^2 C^2 + \beta_2 v_t + \varepsilon}}, \quad \text{formula (46)}$$

$$\delta_{t+i} = -\frac{\eta}{\sqrt{t+i}} \frac{(1-\beta_1)C + \beta_1 m_{t+i-1}}{\sqrt{(1-\beta_2)C^2 + \beta_2 v_{t+i} + \varepsilon}}.$$

Wherein, $i \in \{1, \ldots, C\}$. If $\delta_{t+i} \geq 0$, for $j \in \{1, \ldots, C-1\}$, $\delta_{t+s} \geq 0$ (where $\forall s \in \{j, \ldots, C-1\}$) holds. Using known lemmas, formula (47) can be obtained:

$$x_{t+C} \geq \min\left\{x_t + \sum_{i=t}^{t+C-1} \delta_i, 1\right\} \quad \text{formula (47)}$$

Letting that $i'=C/2$ holds. In order to prove the above formula (45), we need to further prove the following formula (48):

$$\delta = \sum_{i=1}^{t+C-1} \delta_i > 0 \quad \text{formula (48)}$$

Finally, formula (49) can be obtained:

$$\sum_{i=t+1}^{t+C-1} \delta_i = \sum_{i=1}^{C-1} -\frac{\eta}{\sqrt{t+i}} \frac{-(1-\beta_1)\alpha_t + \beta_1 m_{t+i}}{\sqrt{(1-\beta_2)\alpha_t^2 + \beta_2 v_{t+i}}} \geq \quad \text{formula (49)}$$

$$\frac{\eta}{\rho\sqrt{t(1+\beta_2)}}\left(C - i' - \frac{\beta_1^{i'}-1}{1-\beta_1}\right) - \frac{\eta}{\sqrt{t}} \frac{\gamma(1-\beta_1)(1-\gamma^{C-1})}{(1-\gamma)\sqrt{(1-\beta_2)}} \geq 0$$

According to Lemma 2 and the following formula (50), wherein $i' \leq i \leq C$, the following formula (51) can be obtained.

$$v_{t+i-1} = \quad \text{formula (50)}$$

$$(1-\beta_2)\sum_{j=1}^{t+i-1}\beta_2^{t+i-1-j}g_j^2 \leq (1-\beta_2)\left[\frac{\beta_2^{i'-1}C^2}{1-\beta_2^C} + \frac{1}{1-\beta_2}\right] \leq 2$$

$$\sum_{i=t}^{t+C-1} \delta_i \geq \delta_i + \quad \text{formula (51)}$$

$$\frac{\eta}{\rho\sqrt{t(1+\beta_2)}}\left(C - i' - \frac{\beta_1^{i'}-1}{1-\beta_1}\right) - \frac{\eta}{\sqrt{t}} \frac{\gamma(1-\beta_1)(1-\gamma^{C-1})}{(1-\gamma)\sqrt{(1-\beta_2)}} \geq$$

$$\frac{\eta}{\rho\sqrt{t}}\left[\frac{C}{3} - \frac{\beta_1^{C/2-1}}{1-\beta_1} - \frac{3(1-\beta_1)}{2\sqrt{1-\beta_2}}\left(1 + \frac{\gamma(1-\gamma^{C-1})}{1-\gamma}\right)\right] = \frac{\eta}{\sqrt{t}}\gamma$$

When $t \leq T'$, for every $C$ step, $R_T/T \to 0$ holds when $T \to \infty$.

Proof of Theorem 2 is complete.

Proof of Theorem 3.

Setting $\xi$ as an arbitrarily small positive real number. Considering the one-dimensional random convex optimization setting in the domain $[-1, 1]$, for each iteration number $t$, the gradient of $f_t(w)$ is shown in formula (52):

$$\nabla f_t(w) = \quad \text{formula (52)}$$

$$\begin{cases} C\alpha_t \bar{w}_t & \text{for } -1 < \hat{w} \leq 1 \text{ and with probability } p := \frac{1\xi}{C+1}; \\ -\alpha_t \bar{w}_t & \text{for } -1 < \hat{w} \leq 1 \text{ and with probability } 1-p; \end{cases}$$

Wherein, C is a constant based on $\beta_1$, $\beta_2$, $\xi$ and $\alpha^*$. The expectation function is $F(w) = \xi w$. Therefore, the optimal solution in the domain $[-1, 1]$ is $w^* = -1$.

Therefore, the step size is updated by Adam to be formula (53):

$$\Delta_t = \frac{-\eta_t(\beta_1 m_{t-1} + (1-\beta_1)C\alpha_t \bar{w}_t)}{\sqrt{\beta_2 v_{t-1} + (1-\beta_2)C^2\alpha_t^2}} \quad \text{formula (53)}$$

There is a real number C that is large enough so that the lower limit of the average value $E[\Delta_t]$ of $\Delta_t$ in the formula (53) is as shown in formula (54):

$$-\frac{1+\xi}{C+1}\left(\frac{1}{\sqrt{1-\beta_2}} + \frac{-\beta_1(1-\beta_1)\left[\frac{\log(C\alpha^*+1)}{\log(1/\beta_1)}\right]}{\sqrt{(1-\beta_2)(\beta_2-\beta_1^2)}}\right) + \quad \text{formula (54)}$$

$$\left(1 - \frac{1+\xi}{C+1}\right)\frac{1-\beta_1}{\sqrt{\beta_2(1+\xi)C\alpha^* + (1-\beta_2)}}.$$

Wherein C is a function, which is determined by $\beta_1$, $\beta_2$, $\xi$ and $\alpha^*$.

Proof of Theorem 4.

The result of Theorem 4 is used to prove the validity of Algorithm 1, wherein Algorithm 1 is:

---

Using the present disclosure to train a binary neural network
Input: network weight $w_1 \in F$, initial learning rate $\eta$, attenuation coefficient $\{\beta_{1t}\}_{t-1}^T$, attenuation coefficient $\beta_2$, lower limit function $c_l$ and upper limit function $c_u$, $\bar{F} = [c_l, c_u]$
Initialization: gradient first-order moment $m_0$, gradient second-order moment $v_0$
From $t = 1$ to $t = T$, performing the following operation (wherein t is the number of iterations and T is the number of terminations):
  $g_t = \nabla f_t(\bar{w}_t)$
  $m_t = \beta_{1t} m_{t-1} + (1 - \beta_{1t})g_t$
  $v_t = \beta_2 v_{t-1} + (1 - \beta_2)g_t^2$
  $\hat{v}_t = \max(v_t, \hat{v}_{t-1})$
  $\eta_t = \eta/\sqrt{t}$ and $\bar{v}_t = \prod_{\bar{F}}(\hat{v}_t)$
  $V_t = \text{diag}(\bar{v}_t)$
  $\bar{w}_{t+1} = \prod_{\bar{F}, \sqrt{V_t}}(\bar{w}_t - \eta_t m_t/\sqrt{\bar{v}_t})$

---

The above algorithm 1 is described by taking a binary neural network model as an example, and the present disclosure is not limited to other types of neural network models.

The following Theorem 4 provides proof of the convergence of Algorithm 1.

Letting that $w^* = \text{argmin } \Sigma_{t=1}^T f_t(\bar{w})$ holds, wherein $w^*$ exists in the case where F is a closed convex solution.

Formula (55) is known:

$$\bar{w} = \quad \text{formula (55)}$$

$$\prod_{\bar{F}, \sqrt{\bar{v}_t}}\left(\bar{w}_t - \eta_t \hat{V}_t^{-1/2} m_t\right) = \min_{\bar{w} \in \bar{F}}\left\|\hat{V}_t^{1/2}\left(\bar{w} - \left(\bar{w}_t - \eta_t \hat{V}_t^{-1/2} m_t\right)\right)\right\|$$

Wherein, $$\forall \omega^* \in \mathcal{F}; \prod_{\mathcal{F}, \sqrt{\hat{V}_t}}(\omega^*) = \omega^*$$

using Lemma 4 and $u_1 = \tilde{w}_{t+1}$ and $u_2 = w^*$, formula (56) can be obtained:

$$\left\|\hat{V}_t^{1/4}(w_{t+1} - w^*)\right\|^2 \leq \left\|\hat{V}_t^{1/4}\left(\hat{w}_t - \eta_t \hat{V}_t^{-1/2} m_t - w^*\right)\right\|^2 \quad \text{formula (56)}$$

$$= \left\|\hat{V}_t^{1/4}(\hat{w}_t - w^*)\right\|^2 + \eta_t^2 \left\|\hat{V}_t^{-1/4} m_t\right\|^2 - 2\eta_t \langle m_t, \hat{w}_t - w^*\rangle$$

$$= \left\|\hat{V}_t^{1/4}(\hat{w}_t - w^*)\right\|^2 + \eta_t^2 \left\|\hat{V}_t^{-1/4} m_t\right\|^2 - 2\eta_t \langle \beta_{1t} m_{t-1} + (1-\beta_{1t})\tilde{g}_t, \hat{w}_t - w^*\rangle$$

$$= \left\|\hat{V}_t^{1/4}(\hat{w}_t - w^*)\right\|^2 + \eta_t^2 \left\|\hat{V}_t^{-1/4} m_t\right\|^2 - 2\eta_t \langle \beta_{1t} m_{t-1} + (1-\beta_{1t})\alpha_t \overline{w}_t, \hat{w}_t - w^*\rangle$$

Rearranging the above formula (56), formula (57) can be obtained:

$$\langle \alpha_t \overline{w}_t, \tilde{w}_t - w^*\rangle \leq \quad \text{formula (57)}$$

$$\frac{1}{2\eta_t(1-\beta_{1t})}\left[\left\|\hat{V}_t^{1/4}(\tilde{w}_t - w^*)\right\|^2 - \left\|\hat{V}_t^{1/4}(\tilde{w}_{t+1} - w^*)\right\|^2\right] +$$

$$\frac{\eta_t}{2(1-\beta_{1t})}\left\|\hat{V}_t^{-1/4} m_t\right\|^2 + \frac{\beta_{1t}}{1-\beta_{1t}}\langle m_{t-1}, \tilde{w}_t - w^*\rangle \leq$$

$$\frac{1}{2\eta_t(1-\beta_{1t})}\left[\left\|\hat{V}_t^{1/4}(\tilde{w}_t - w^*)\right\|^2 - \left\|\hat{V}_t^{1/4}(\tilde{w}_{t+1} - w^*)\right\|^2\right] +$$

$$\frac{\eta_t}{2(1-\beta_{1t})}\left\|\hat{V}_t^{-1/4} m_t\right\|^2 + \frac{\eta_t \beta_{1t}}{2(1-\beta_{1t})}\left\|\hat{V}_t^{-1/4} m_{t-1}\right\|^2 +$$

$$\frac{\beta_{1t}}{2\eta_t(1-\beta_{1t})}\left\|\hat{V}_t^{1/4}(\tilde{w}_t - w^*)\right\|^2$$

The second inequality in formula (54) can be proved by Cauchy-Schwarz and Young's inequality. We use the convexity of the $f_t$ function to restrict the regret at each step to obtain the following formula (58):

$$\sum_{t=1}^{T} f_t(\hat{w}_t) - f_t(w^*) \leq \sum_{t=1}^{T} \langle \alpha_t \overline{w}_t, \tilde{w}_t - w^*\rangle \leq \quad \text{formula (58)}$$

$$\sum_{t=1}^{T}\left[\frac{1}{2\eta_t(1-\beta_{1t})}\left[\left\|\hat{V}_t^{1/4}(\tilde{w}_t - w^*)\right\|^2 - \left\|\hat{V}_t^{1/4}(\tilde{w}_{t+1} - w^*)\right\|^2\right] +$$

$$\frac{\eta_t}{2(1-\beta_{1t})}\left\|\hat{V}_t^{-1/4} m_t\right\|^2 + \frac{\eta_t \beta_{1t}}{2(1-\beta_{1t})}\left\|\hat{V}_t^{-1/4} m_{t-1}\right\|^2 +$$

$$\frac{\beta_{1t}}{2\eta_t(1-\beta_{1t})}\left\|\hat{V}_t^{1/4}(\tilde{w}_t - w^*)\right\|^2\right]$$

By using Lemma 3, we can get formula (59):

$$\sum_{t=1}^{T} f_t(\hat{w}_t) - f_t(w^*) \leq \quad \text{formula (59)}$$

$$\sum_{t=1}^{T}\left[\frac{1}{2\eta_t(1-\beta_{1t})}\left[\left\|\hat{V}_t^{1/4}(\hat{w}_t - w^*)\right\|^2 - \left\|\hat{V}_t^{1/4}(\hat{w}_{t+1} - w^*)\right\|^2\right]\right] +$$

$$\frac{\beta_{1t}}{2\eta_t(1-\beta_{1t})}\left\|\hat{V}_t^{1/4}(\hat{w}_t - w^*)\right\|^2 +$$

$$\frac{\eta\sqrt{1+\log T}}{(1-\beta_1)^2(1-\beta_1/\sqrt{\beta_2})\sqrt{(1-\beta_2)}}\sum_{i=1}^{d}\|\alpha_{1:T,i}\|_2 \leq$$

$$\frac{1}{2\eta_t(1-\beta_1)}\left\|\hat{V}_t^{1/4}(\hat{w}_1 - w^*)\right\|^2 +$$

$$\frac{1}{2(1-\beta_1)}\sum_{t=2}^{T}\left[\frac{\left\|\hat{V}_t^{1/4}(\hat{w}_t - w^*)\right\|^2}{\eta_t} - \frac{\left\|\hat{V}_{t-1}^{1/4}(w_t - w^*)\right\|^2}{\eta_{t-1}}\right] +$$

$$\sum_{t=1}^{T}\left[\frac{\beta_{1t}}{2\eta_t(1-\beta_{1t})}\left\|\hat{V}_t^{1/4}(\hat{w}_t - w^*)\right\|^2\right] +$$

$$\frac{\eta\sqrt{1+\log T}}{(1-\beta_1)^2(1-\beta_1/\sqrt{\beta_2})\sqrt{(1-\beta_2)}}\sum_{i=1}^{d}\|\alpha_{1:T,i}\|_2 =$$

$$\frac{1}{2\eta_t(1-\beta_1)}\sum_{i=1}^{d}\hat{v}_{1,i}^{1/2}(\hat{w}_{1,i} - w_i^*)^2 +$$

$$\frac{1}{2(1-\beta_1)}\sum_{t=2}^{T}\sum_{i=1}^{d}(\hat{w}_{t,i} - w_i^*)^2\left[\frac{\hat{v}_{t,i}^{1/2}}{\eta_t} - \frac{v_{t-1,i}^{1/2}}{\eta_{t-1}}\right] +$$

$$\frac{1}{2(1-\beta_1)}\sum_{t=1}^{T}\sum_{i=1}^{d}\frac{\beta_{1t}(\hat{w}_{t,i} - w_i^*)^2 \hat{v}_{t,i}^{1/2}}{\eta_t} +$$

$$\frac{\eta\sqrt{1+\log T}}{(1-\beta_1)^2(1-\beta_1/\sqrt{\beta_2})\sqrt{(1-\beta_2)}}\sum_{i=1}^{d}\|\alpha_{1:T,i}\|_2$$

Since $\beta_{1t} \leq \beta_1 < 1$, according to the above formula (59), formula (60) can be obtained.

$$\sum_{t=1}^{T} f_t(\hat{w}_t) - f_t(w^*) \leq \frac{1}{2\eta_t(1-\beta_t)}\sum_{i=1}^{d}\hat{v}_{1,i}^{1/2}(\hat{w}_{1,i} - w_i^*)^2 + \quad \text{formula (60)}$$

$$\frac{1}{2(1-\beta_1)}\sum_{t=2}^{T}\sum_{i=1}^{d}(\hat{w}_{t,i} - w_i^*)^2\left[\frac{\hat{v}_{t,i}^{1/2}}{\eta_t} - \frac{\hat{v}_{t-1,i}^{1/2}}{\eta_{t-1}}\right] +$$

$$\frac{\eta\sqrt{1+\log T}}{(1-\beta_1)^2(1-\beta_1/\sqrt{\beta_2})\sqrt{(1-\beta_2)}}\sum_{i=1}^{d}\|\alpha_{1:T,i}\|_2 +$$

$$C(\alpha_t)\sum_{t=1}^{T}\sqrt{\|\tilde{w}_t - w^*\|\sqrt{\hat{v}_{t-1}}}$$

Based on the constraint on $\Upsilon_t$, formula (61) can be obtained:

$$\frac{\alpha_t \hat{v}_{t,i}^{1/2}}{\eta_t} \geq \frac{\alpha_{t-1}\hat{v}_{t-1,i}^{1/2}}{\eta_{t-1}} \quad \text{formula (61)}$$

In the feasible domain of the function, using $L_\infty$ and all the above formulas, formula (62) can be obtained:

$$R_T = \sum_{t=1}^{T} f_t(\tilde{w}_t) - f_t(w^*) \leq \qquad \text{formula (62)}$$

$$\frac{D_\infty^2 \sqrt{T}}{\eta(1-\beta_1)} \sum_{i=1}^{d} \hat{v}_{T,i}^{1/2} + \frac{D_\infty^2}{2(1-\beta_1)} \sum_{t=1}^{T}\sum_{i=1}^{d} \frac{\beta_{1t}\hat{v}_{T,i}^{1/2}}{\eta_t} +$$

$$\frac{\eta\sqrt{1+\log T}}{(1-\beta_1)^2(1-\beta_1/\sqrt{\beta_2})\sqrt{(1-\beta_2)}} \sum_{i=1}^{d} \|\alpha_{1:T,i}\|_2 +$$

$$L_\infty D_\infty \sum_{t=1}^{T} \sqrt{\|w_t - \alpha^*\|\sqrt{\hat{v}_{t-1}}}$$

According to the following formula (63), $$\tilde{w}_t = \alpha_t \operatorname{sign}(w); \text{ s.t. } \operatorname{sign}(w) \in (S^d) \qquad \text{formula (63)}$$

The following formula (64) can be obtained.

$$R_T = \sum_{t=1}^{T} f_t(\tilde{w}_t) - f_t(w^*) \leq \qquad \text{formula (64)}$$

$$\frac{D_\infty^2 \sqrt{T}}{\eta(1-\beta_1)} \sum_{i=1}^{d} \hat{v}_{T,i}^{1/2} + \frac{D_\infty^2}{2(1-\beta_1)} \sum_{t=1}^{T}\sum_{i=1}^{d} \frac{\beta_{1t}\hat{v}_{T,i}^{1/2}}{\eta_t} +$$

$$\frac{\eta\sqrt{1+\log T}}{(1-\beta_1)^2(1-\beta_1/\sqrt{\beta_2})\sqrt{(1-\beta_2)}} \sum_{i=1}^{d} \|\alpha_{1:T,i}\|_2 +$$

$$L_\infty D_\infty \sum_{t=1}^{T} \sqrt{D_\infty + \alpha^2 d_{\tilde{w}}^2}.$$

What is claimed is:

1. A training method for training a neural network model performed by a server including one or more processors that are configured, upon execution of instructions stored in one or more memories, to perform the training method, comprising:
    selecting a maximum value from weight gradients determined in a current training and weight gradients from several previous trainings when updating at least one weight used in computation for detecting objects from image data in the neural network model stored in the one or more memories during backpropagation;
    determining to tighten constraints on a constraint range for selected gradients in a case where a bit width of weights in the neural network model stored in the one or more memories is smaller than a threshold or a number of training iterations is fewer than a threshold, and to loosen the constraints on the constraint range for selected gradients in a case where the bit width of weights in the neural network model stored in the one or more memories is larger than a threshold or the number of training iterations is greater than a threshold;
    constraining a gradient that exceeds the constraint range to be within the constraint range in a case where the selected gradients exceed the determined constraint range; and
    updating the weights of one or more layers of the neural network model stored in the one or more memories that is used in the computation for detecting objects from the image data using constrained gradients.

2. The training method according to claim 1, wherein when a gradient is larger than an upper limit value of the constraint threshold range, the gradient is constrained to be the upper limit value; and
    when a gradient is smaller than a lower limit value of the constraint threshold range, the gradient is constrained to be the lower limit value.

3. The training method according to claim 1, wherein an upper limit value of the constraint threshold range monotonically decreases in successive trainings, and a lower limit value of the constraint threshold range monotonically increases in successive trainings.

4. The training method according to claim 1, further comprising:
    determining a quantization error of each weight in the neural network model, and using a maximum quantization error as a quantization error of the neural network model; and
    determining the constraint threshold range using the quantization error and the number of training iterations of the neural network model, wherein the determined constraint threshold range is used to constrain the at least one gradient.

5. The training method according to claim 1, further comprising:
    determining, for at least one weight in the neural network model, a quantization error of the weight; and
    determining the constraint threshold range using quantization error of the weight and the number of training iterations, wherein the determined constraint threshold range is used to constrain a gradient of the weight.

6. The training method according to claim 1 wherein when the bit width of weights the neural network model becomes lower, a number of previous multiple trainings required to determine the weighted maximum value becomes less.

7. A training system of a neural network model, comprising:
    a server that stores at least one first neural network model, wherein the first neural network model provides information for synchronizing a second neural network model, and the server is used to perform the following processing:
        selecting a maximum value from weight gradients determined in a current training and weight gradients from several previous trainings when updating at least one weight used in computation for detecting objects from image data in the neural network model stored on the server during backpropagation;
        determining to tighten constraints on a constraint range for selected gradients in a case where a bit width of weights in the neural network model stored on the server is smaller than a threshold or a number of training iterations is fewer than a threshold, and to loosen the constraints on the constraint range for selected gradients in a case where the bit width of weights in the neural network model stored on the server is larger than a threshold or the number of training iterations is greater than a threshold;
        constraining a gradient that exceeds the constraint range to be within the constraint range in a case where the selected gradients exceed the determined constraint range; and
        updating the weights of one or more layers of the neural network model stored on the server that is used in the computation for detecting objects from the image data in the neural network using constrained gradients; and a terminal that stores the second neural network model, wherein the terminal is used to synchronize the second neural network model using the weight output by the server.

8. The training system according to claim 7, the server is further used to:
determine a quantization error of each weight in the first network model, and use a maximum quantization error as a quantization error of the first network model; and
determine the constraint threshold range using the quantization error and the number of training iterations of the first network model, wherein the determined constraint threshold range is used to constrain the at least one gradient.

9. The training system according to claim 7, wherein the server is further used to:
determine, for at least one weight in the first network model, a quantization error of the weight; and
determine the constraint threshold range using the quantization error of the weight and the number of training iterations, wherein the determined constraint threshold range is used to constrain a gradient of the weight.

10. The training system according to claim 7, wherein the server is further used to:
determine, for at least one weight in the first network model, a weighted maximum value from a gradient of the weight determined in current training and constrained gradients of the weight in previous multiple trainings; and
determine whether the weighted maximum value is within the constraint threshold range, and constrain a weighted maximum value that exceeds the constraint threshold range to be within the constraint threshold range.

11. A training apparatus of a neural network model, comprising:
one or more memories storing instructions; and
one or more processors that, upon execution of the instructions, configures the one or more processors to:
selecting a maximum value from weight gradients determined in a current training and weight gradients from several previous trainings when updating at least one weight used in computation for detecting objects from image data in the neural network model stored in the one or more memories during backpropagation;
determining to tighten constraints on a constraint range for selected gradients in a case where a bit width of weights in the neural network model stored in the one or more memories is smaller than a threshold or a number of training iterations is fewer than a threshold, and to loosen the constraints on the constraint range for selected gradients in a case where the bit width of weights in the neural network model stored in the one or more memories is larger than a threshold or the number of training iterations is greater than a threshold;
constraining a gradient that exceeds the constraint range to be within the constraint range in a case where the selected gradients exceed the determined constraint range; and
updating the weights of one or more layers of the neural network model stored in the one or more memories that is used in the computation for detecting objects from the image data in the neural network using constrained gradients.

12. The training apparatus according to claim 11, wherein the one or more processors are further used to:
determine a quantization error of each weight in the neural network model, and use a maximum quantization error as a quantization error of the neural network model; and
determine the constraint threshold range using the quantization error and the number of training iterations of the neural network model, wherein the determined constraint threshold range is used to constrain the at least one gradient.

13. The training apparatus according to claim 11, wherein the one or more processors are further used to:
determine, for at least one weight in the network model, a quantization error of the weight; and
determine the constraint threshold range using the quantization error of the weight and the number of training iterations, wherein the determined constraint threshold range is used to constrain a gradient of the weight.

14. The training apparatus according to claim 11, wherein the one or more processors are further used to:
determine, for at least one weight in the neural network model, a weighted maximum value from a gradient of the weight determined in current training and constrained gradients of the weight in previous multiple trainings; and
determine whether the weighted maximum value is within the constraint threshold range, and constrain a weighted maximum value that exceeds the constraint threshold range to be within the constraint threshold range.

15. A method of using a neural network model to output a classification, comprising:
Storing, in one or more memories, a neural network model trained based on a training method, wherein the training method comprising:
selecting a maximum value from weight gradients determined in a current training and weight gradients from several previous trainings when updating at least one weight used in computation for detecting objects from image data in the neural network model stored in the one or more memories during backpropagation;
determining to tighten constraints on a constraint range for selected gradients in a case where a bit width of weights in the neural network model is smaller than a threshold or a number of training iterations is fewer than a threshold, and to loosen the constraints on the constraint range for selected gradients in a case where the bit width of weights in the neural network model is larger than a threshold or the number of training iterations is greater than a threshold;
constraining a gradient that exceeds the constraint range to be within the constraint range in a case where the selected gradients exceed the determined constraint range; and
updating the weights of one or more layers of the neural network model stored in memory that is used in the computation for detecting objects from the image data in the neural network using constrained gradients;
receiving a data set which is required to correspond to a task which can be executed by the stored neural network model; and
performing operation on the data set in each layer in the stored neural network model from top to bottom, and outputting a result.

16. An application apparatus of a neural network model, comprising:
- a memory that stores a neural network model trained based on a training method that includes
- selecting a maximum value from weight gradients determined in a current training and weight gradients from several previous trainings when updating at least one weight used in computation for detecting objects from image data in the stored neural network model during backpropagation;
- determining to tighten constraints on a constraint range for selected gradients in a case where a bit width of weights in the stored neural network model is smaller than a threshold or a number of training iterations is fewer than a threshold, and to loosen the constraints on the constraint range for selected gradients in a case where the bit width of weights in the stored neural network model is larger than a threshold or the number of training iterations is greater than a threshold;
- constraining a gradient that exceeds the constraint range to be within the constraint range in a case where the selected gradients exceed the determined constraint range; and
- updating the weights of one or more layers of the stored neural network model that is used in the computation for detecting objects from the image data in the neural network using constrained gradients; and
- one or more processors that configure the application apparatus to receive a data set which is required to correspond to a task which can be executed by the stored neural network model; and
- to perform operation on the data set in each layer in the stored neural network model from top to bottom, and output a result.

17. A non-transitory computer-readable storage medium storing instructions, which, when executed by a computer, cause the computer to perform the training method of the neural network model, the method comprising:
- selecting a maximum value from weight gradients determined in a current training and weight gradients from several previous trainings when updating at least one weight used in computation for detecting objects from image data in the neural network model stored in one or more memories of the computer during backpropagation;
- determining to tighten constraints on a constraint range for selected gradients in a case where a bit width of weights in the neural network model stored in one or more memories of the computer is smaller than a threshold or a number of training iterations is fewer than a threshold, and to loosen the constraints on the constraint range for selected gradients in a case where the bit width of weights in the neural network model stored in one or more memories of the computer is larger than a threshold or the number of training iterations is greater than a threshold;
- constraining a gradient that exceeds the constraint range to be within the constraint range in a case where the selected gradients exceed the determined constraint range; and
- updating the weights of one or more layers in the neural network model stored in the one or more memories of the computer which is used in the computation for detecting objects from the image data in the neural network using constrained gradients.

* * * * *